(12) United States Patent
Hofbauer

(10) Patent No.: US 8,290,653 B2
(45) Date of Patent: Oct. 16, 2012

(54) POWERTRAIN WITH MULTIPLE, SELECTABLE POWER SOURCES

(75) Inventor: Peter Hofbauer, West Bloomfield, MI (US)

(73) Assignee: EcoMotors International, Inc., Allen Park, MI (US)

( * ) Notice: Subject to any disclaimer, the term of this patent is extended or adjusted under 35 U.S.C. 154(b) by 535 days.

(21) Appl. No.: 12/625,511

(22) Filed: Nov. 24, 2009

(65) Prior Publication Data

US 2010/0082192 A1    Apr. 1, 2010

Related U.S. Application Data

(63) Continuation-in-part of application No. 12/583,881, filed on Aug. 27, 2009.

(60) Provisional application No. 61/190,312, filed on Aug. 27, 2008, provisional application No. 61/201,884, filed on Dec. 15, 2008.

(51) Int. Cl.
*B60L 9/00* (2006.01)
(52) U.S. Cl. ......................................................... 701/22
(58) Field of Classification Search .................. None
See application file for complete search history.

(56) References Cited

U.S. PATENT DOCUMENTS

| | | | |
|---|---|---|---|
| 3,194,087 A | 7/1965 | Kronogard | |
| 4,533,011 A | 8/1985 | Heidemeyer et al. | |
| 5,492,189 A | 2/1996 | Kriegler et al. | |
| 5,495,912 A | 3/1996 | Gray et al. | |
| 6,170,443 B1 | 1/2001 | Hofbauer | |
| 6,306,056 B1 | 10/2001 | Moore | |
| 6,896,635 B2 * | 5/2005 | Tumback | 475/5 |
| 8,008,804 B2 * | 8/2011 | Capp et al. | 307/44 |
| 2002/0117860 A1 | 8/2002 | Man et al. | |
| 2003/0037978 A1 | 2/2003 | Hofbauer | |
| 2003/0104899 A1 | 6/2003 | Keller | |
| 2005/0077881 A1 * | 4/2005 | Capp et al. | 322/29 |
| 2005/0189894 A1 | 9/2005 | Komiyama et al. | |
| 2008/0110684 A1 * | 5/2008 | Kaita | 180/65.2 |
| 2008/0288192 A1 | 11/2008 | Kumar et al. | |
| 2011/0010030 A1 * | 1/2011 | Yamamoto | 701/22 |

* cited by examiner

*Primary Examiner* — Thomas Tarcza
*Assistant Examiner* — Nagi Murshed
(74) *Attorney, Agent, or Firm* — Diana D. Brehob

(57) ABSTRACT

A hybrid engine control system for use with a vehicle or other load which employs a motor/generator unit connected through controllable couplers to a kinetic energy storage device and to one or more internal combustion engine modules in a programmed manner. Several embodiments provide varying configurations to satisfy various power and packaging design requirements.

20 Claims, 33 Drawing Sheets

| Battery >75% full | Pre-Start | Start | Take off | GP 0 Gliding | GP 1 Electric | GP 2 opoc 1 | GP 3 opoc 1+2 | BP 0 Gliding | BP 1 Electric | BP 2 Brake |
|---|---|---|---|---|---|---|---|---|---|---|
| ECC-GA | | | closed | closed | closed | closed | closed | closed | closed | closed |
| E-M/G | | | on | off | on | on, controlled with opoc1 | on | off | on | on |
| ECC1 | | | open | open | open | closed | closed | open | open | closed |
| opoc1 | | | on | off | off | on, controlled with E-M | on | off | off | on |
| ECC2 | | | open | open | open | open | closed | open | open | closed |
| opoc2 | | | off | off | off | off | on | off | off | on |

Fig. 15

| Battery < 30% full | Pre-Engine-Start | opoc1 Start | Take off | GP 0 Gliding | GP 1 Electric | GP 2 opoc 1 | GP 3 opoc 1+2 | BP 0 Gliding | BP 1 Electric | BP 2 Brake |
|---|---|---|---|---|---|---|---|---|---|---|
| ECC-GA | open | open | closes controlled | closed | | closed | closed | closed | closed | closed |
| E-M/G | E-Motor accelerates Flywheel to 1000 rpm | on | on | off | | on, controlled with opoc1 | on | off | on | on |
| ECC1 | open | closes controlled | closed | open | | closed | closed | open | open | closed |
| opoc1 | off | Puls-Start | on | off | | on + Recharges the Battery | on | off | off | on |
| ECC2 | open | open | open | open | | open | closed | open | open | closed |
| opoc2 | off | off | off | off | | off | on | off | off | on |

Fig. 16

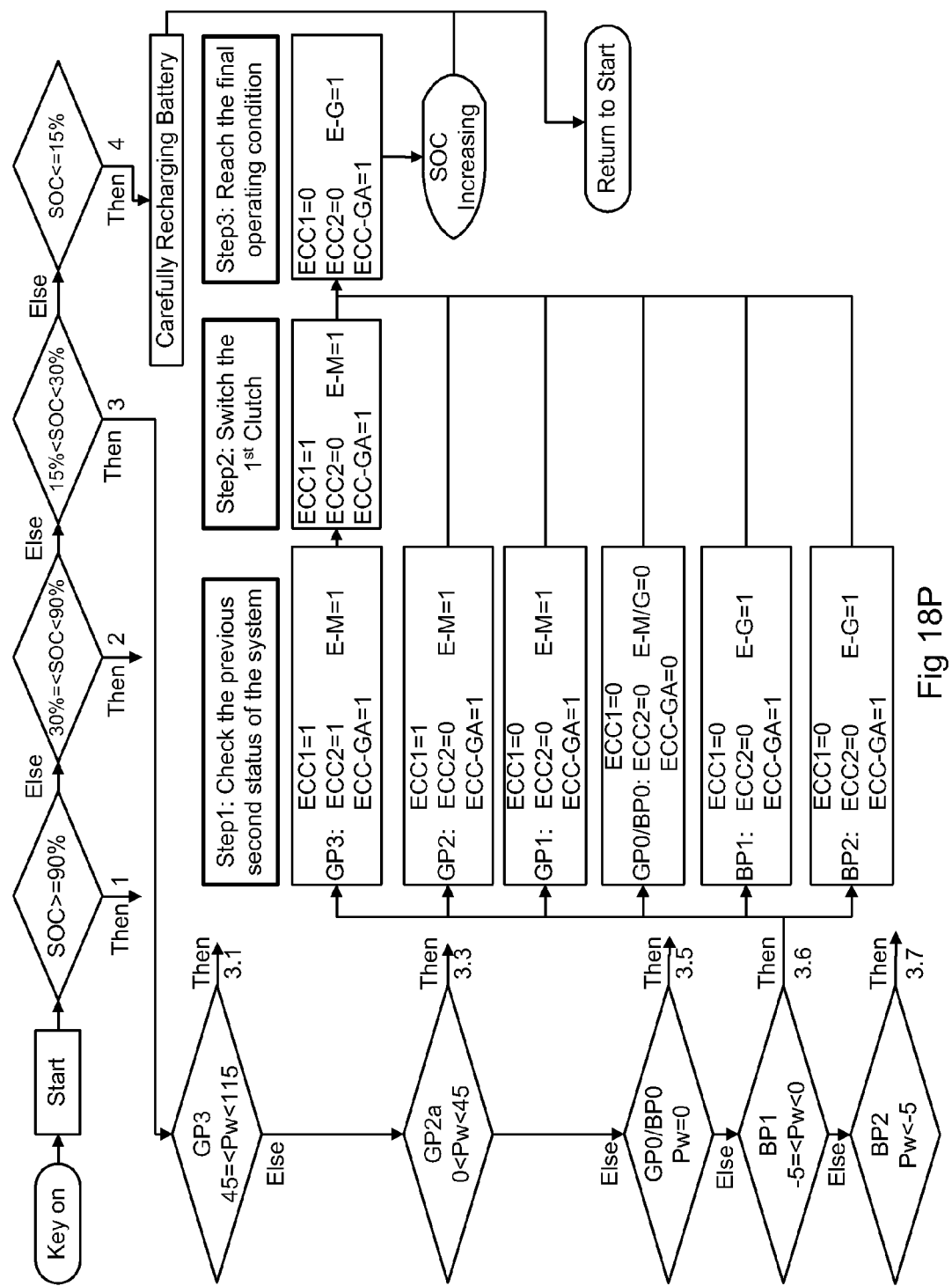

POWERTRAIN WITH MULTIPLE, SELECTABLE POWER SOURCES

RELATED APPLICATIONS

This application is a continuation-in-part of Ser. No. 12/583,881, filed Aug. 27, 2009 and claims benefit of provisional applications Ser. No. 61/190,312, filed Aug. 27, 2008 and Ser. No. 61/201,884, filed Dec. 15, 2008.

TECHNICAL FIELD

This invention is related to the field of internal combustion engines and more specifically to a hybrid vehicle drive system that utilizes at least two prime mover modules and an alternative drive power source.

BACKGROUND

Conventional hybrid engine systems used for vehicle power plants rely on a single engine that is interconnected with a motor/generator. While significant fuel efficiencies are achieved using such combinations, there is room for improvement in terms of mileage efficiencies and emission reductions.

Recent configurations in hybrid systems have also included a plurality of IC engines of various power capacities in combination with a motor/generator and transmission to power a vehicle. In U.S. Pat. No. 6,722,458, for instance, IC engines having different power capacities are shown to be switchably connected in parallel to drive a transmission, while a motor/generator is separately connectable to a separate axle for either assisting the power drive to the vehicle or for generating electricity.

The 2-cycle engine described in U.S. Pat. No. 6,170,443 entitled "Internal combustion engine with a single crankshaft and having opposed cylinders and opposed pistons" ("OPOC engine") and incorporated herein by reference, has been demonstrated to offer significant improvements in both fuel efficiency and emissions when employed as a prime mover in vehicles and in stationary applications.

SUMMARY OF THE INVENTION

The charge depletion hybrid system of the present inventive concept provides for relatively more efficient power transfer from available power sources, as well as mechanical and control simplicity. An internal combustion engine ("ICE") and electric motor (EM) drive the vehicle in tandem. Therefore, the size of the ICE can be greatly reduced in comparison to the engine used to conventionally power a vehicle. This reduction is possible because the ICE used in the hybrid system is sized to meet steady state highway loads, and the EM is provided for low speed driving and to assist the ICE in tandem during transient conditions. Reducing the engine size allows the engine to operate at higher average thermal efficiency and within its ideal operating region, and thereby increasing fuel efficiency.

The present inventive concept expands the tandem hybrid concept by splitting the ICE drive into two separate engine modules: a primary engine for maximum efficiency and a secondary engine for maximum power and acceleration. In addition, the EM is an electrical Starter Motor/Generator ("E-M/G") that is used as a low speed power source alone or combined with the output of the primary ICE, or also with both the primary and secondary engines, as necessary, to provide supplemental power. Of course the E-M/G also serves to function in a generator mode to provide electrical energy to recharge the batteries and for braking assist.

The disclosed embodiments utilize a primary ICE module that is appropriately configured to supply average driving power which covers the majority of expected driving conditions and light to moderate acceleration. The secondary ICE module is a more powerful configuration to boost powertrain torque when required.

The inventive subject matter provides several improvements to hybrid engine technology by employing a plurality of separate (primary and secondary) prime mover engine modules that can be separately brought on-line in tandem, as needed, and in various combinations with an electric motor/generator to supply drive power to a vehicle transmission or other load.

Control scenarios for switching among the plurality of engine modules and the electric motor are disclosed which are based on gas pedal torque requested, pedal acceleration and coasting.

Control scenarios concerning regenerative and direct braking are based on brake pedal force and movement.

The inventive subject matter may be seen as suitable as either an original prime mover for a vehicle designed to take advantage of the efficiencies offered, or as a "drop-in" substitute hybrid power plant for a conventional internal combustion engine to drive a conventional transmission in a vehicle and therefore provide a low cost conversion.

When the inventive subject matter is combined in a vehicle with other low friction technologies, such as low drag brakes, low rolling resistance tires, and/or coasting transmissions, significant increases in overall fuel efficiency can be realized.

The inventive subject matter's use of OPOC engine technology in the disclosed embodiments as a hybrid power plant allows other significant improvements in vehicle fuel efficiencies to be realized due to: the low weight of this type of engine (up to 25% weight reduction over conventional engines); its low profile shape (allowing better aerodynamic body design); and its adaptability to burn diesel fuel, as well as gasoline and other fuels with low emissions.

Other engine or prime mover sources can be substituted for OPOC engine technology when desired and within the concept of the inventive subject matter. For instance, turbines, fuel cells, pneumatic motors (compressed gas) hydraulic pumps, individual 2 or 4 cycle IC engines or combinations thereof, and additional electric motors connected to electric storage devices, can be used as modules that are separately brought on-line to supplement the initial electrical drive system.

It is an object of the present invention to provide a coupling system for power transfer between powerable modules and an integrator device. A coupler is selectably couplable with at least two powerable modules. The coupler comprises at least two receivers, with each receiver linked to a moving element of a separately powerable module. The integrator is engagable with the at least one receiver so that the total power transfer output by the coupling system is derived from a sum of power input to the integrator via one or more of the receivers engaged with the integrator. A controller switches the engagement of the integrator with one or more receivers according to a selected power profile defining which powerable modules are to be engaged through the coupling system with the integrator.

It is another object of the present invention to provide a hybrid engine for an automotive vehicle that includes: a motor/generator unit; a primary engine module; a secondary engine module; a kinetic energy storage device; a first controllable coupler activated to connect the motor/generator unit to the kinetic energy storage device; a second controllable coupler activated to connect the primary engine module to the kinetic energy storage device; a third controllable coupler activated to connect the secondary engine module to the kinetic energy storage device; a power take-off connectable to the kinetic storage device for providing rotational torque forces from the kinetic storage device to a load; a fourth controllable coupler activated to connect the kinetic energy storage device to the load through the power take-off; and a controller programmed to react to various predetermined inputs for activating or deactivating the couplers during the operation of the vehicle.

It is a further object of the present inventive concept to provide a hybrid engine system that is programmable to vary its operational determination profile in accordance with a plurality of input parameters. Parameters such as external air temperature, oxygen level, mass air measurements, altitude, weight of load in vehicle, speed of vehicle, temperatures of engine modules, speeds of engine modules, speed of flywheel, temperature of flywheel, road conditions (uphill, downhill, flat, rough, smooth, etc.), fuel energy properties, driver selection of high fuel efficiency or performance, and battery charge, may be used for these operational determinations. Also, GPS or cell tower triangulation location information may be utilized by the controller in order to anticipate changes in altitude, road conditions or road characteristics. Data gathered, as part of vehicle uplinks from the experiences of other vehicles traveling over the same locations, may be stored and then considered by the controller when the vehicle approaches that location in order to determine the best and most efficient operation profile for the system in the controlled vehicle. Additional data may be gathered from surrounding vehicles in a data communication network to allow the controller to learn, from the experience of such vehicles, the most effective control profile for the current conditions at that location.

The multi-module approach to the disclosed embodiments allow for a "Limp Home" mode operation through redundancy. A central power take-off, in many of the embodiments, between two symmetric engines is used to power a common kinetic storage device (integrator) provides the ability to run on a single engine, should the other fail.

The position of the E-M/G in the disclosed embodiments connectable to the kinetic storage device allows for an all-electric vehicle ("EV") operation under various conditions. Examples of all EV conditions are:
Stop and go traffic;
Reversing or slow forward speed; and
Zero emissions operation (mandated in some locations or communities).

Because of the flexibility in coupling or decoupling the kinetic energy storage device from the transmission which is used to drive the vehicle, the disclosed embodiments can also function as a stand-alone generator for supplying electrical power outside of the vehicle. The engine(s) and E-M/G can be selectively coupled to the kinetic energy storage device while the kinetic energy storage device is decoupled from the transmission drive to create a portable generator set capable of supplying the nominal power output of the E-M/G.

Closed loop crankshaft phasing control is also achievable in the inventive concept, since the powertrain management control system can utilize multiple sensors to actuate the coupler mechanisms to engage and disengage the respective clutches that may be used in the couplers. The control system includes "Smart" adaptive control which compensates for changes in clutch wear, or changes in friction coefficient due to moisture/temperature, etc. Three high resolution speed sensors are included for each engine and one for the kinetic energy storage device (flywheel) to provide the information necessary for accurate synchronization of the two engine modules. This information allows the adaptive control system to phase the second engine to within 5 degrees of the primary engine within several engine cycles when both are running in tandem.

In addition to the integrated location of the E-M/G depicted in several disclosed embodiment, the electric motor/generator can be placed directly on one of the powertrain shafts or remotely mounted and coupled via conventional power transmission means such as a belt, chain or gear drive.

BRIEF DESCRIPTION OF THE DRAWINGS

FIG. 15 is chart of various operational modes, when the battery is at 75% charge or more.

FIG. 16 is chart of various operational modes when the battery is at 30% charge or less.

DETAILED DESCRIPTION OF THE INVENTION

While the inventive subject matter is summarized above as being applicable for several types of internal combustion engines, it is exemplified herein as being embodied with 2-cycle OPOC engine modules, such as that shown in the above-referenced U.S. Pat. No. 6,170,443.

Figure 1:
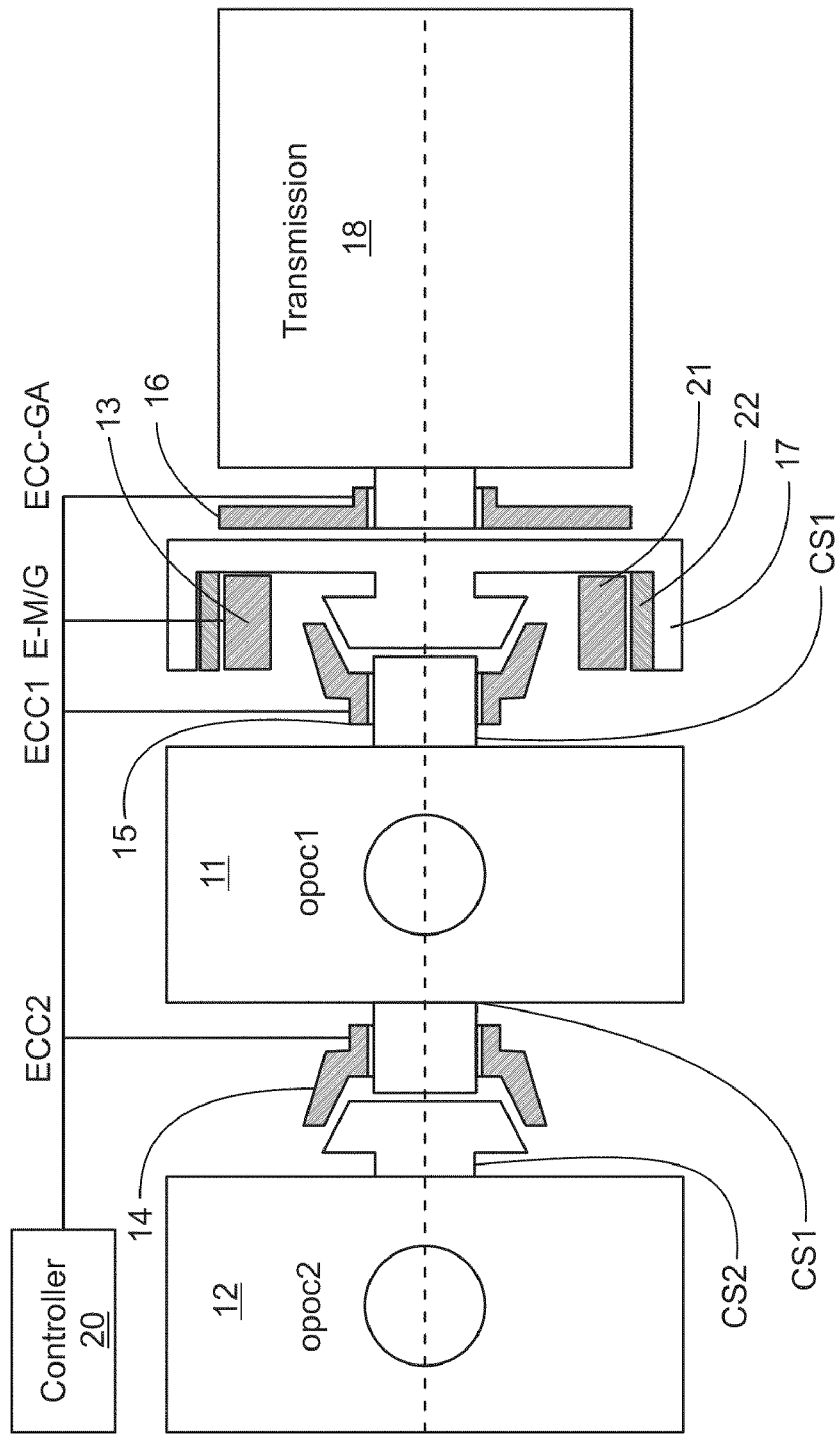
FIG. 1 is a schematic representation of a first embodiment of the inventive subject matter.

FIG. 1 illustrates a first embodiment 10 of the present invention which includes a primary OPOC1 ICE module 11, a secondary OPOC2 ICE module 12, an electrical Starter Motor/Generator E-M/G 13, and several electrically controlled couplings 14, 15 and 16, with receivers that provide various combinations of drive torque via a kinetic energy mass storage device (flywheel) 17 to a vehicle transmission load 18.

In each of the embodiments shown and described herein, the Starter Motor/Generator E-M/G and the kinetic storage device are depicted as separately functional elements. However, the two elements are interactive to a point that when the Starter Motor/Generator E-M/G is energized by the controller to act as either a motor or a generator, it is electrically coupled with the flywheel in order to operate. This is because the embodiments shown herein, take advantage of the mass offered by rotating permanent magnets that are normally found in a starter motor/generator by incorporating them in the flywheel mass. Therefore, when the Starter Motor/Generator E-M/G is not energized to act as either a motor or a generator, its permanent magnets are no longer functionally included therein, but still constitute part of the flywheel mass. It is certainly conceivable that one could construct an embodiment in which all the starter motor/generator elements are separate from the kinetic storage device if engineering conditions dictate a less efficient design than those shown herein.

In the first embodiment shown in FIG. 1, the flywheel 17 is connected to the transmission drive shaft 19 via a coupling ECC-GA, which is depicted here as an electrically controlled clutch 16 that is switchably activated by the controller 20.

Coupling ECC1 is depicted as an electrically controlled clutch 15 that is activated by controller 20 to provide a torque connection between flywheel 17 and a crankshaft CS1 extending from primary engine module 11. Coupling ECC2 is depicted as an electrically controlled clutch 14 that is activated by controller 20 to provide a torque connection between crankshaft CS1 and crankshaft CS2 extending from secondary engine module 12. In the alternative, ECC2 may be a hydraulic clutch that is closed by controlled hydraulic pressure.

Since the pistons in opposing cylinders of an OPOC engine module operate 180° out of phase, a second OPOC engine module can be timed to operate at 90° out of phase with respect to the first OPOC. Such timing provides a combined set of modules with a smoothly balanced operation. When both the primary and secondary engine modules are desired to be in operation, clutch ECC2 is activated in addition to ECC1. ECC2 slips when first activated until the phase angle between the two engine modules is at 90°. At that phase angle, clutch ECC2 closes and engages the crankshafts CS1 and CS2 so that the primary and secondary engines are working in tandem and in a phased relationship that maintains a smoothly balanced operation.

Starter Motor/Generator E-M/G contains stationary electromagnetic and electrically energizable coils 21 that function as the stator. The permanent magnets 22 of the Starter Motor/Generator E-M/G, in this and other disclosed embodiments, are carried by the flywheel and function as the rotor. The Starter Motor/Generator E-M/G is electrically coupled to the permanent magnets (rotor) 22 on the rotating flywheel 17 at the direction of controller 20. In motor mode, controller 20 switches electrical current to flow through the stationary (stator) coils 21 of the E-M/G from an on-board electrical energy source (battery, capacitor, fuel cell or other acceptable electrical charge storage device) to provide an induced rotational driving force to the permanent magnets 22 on the flywheel 17. In generator mode, controller 20 reverse switches electrical current induced in stationary (stator) coils 21 by permanent magnets (rotor) 22 rotating with flywheel 17 to flow back to the on-board electrical energy source and provide recharging, or regenerative braking.

In this manner, the Starter Motor/Generator E-M/G interacts with flywheel 17 when stator coils 21 of the Starter Motor/Generator E-M/G are switched by controller 20 to be electrically energized from an electrical source to drive flywheel 17; or to provide electrical recharging power back to the source from flywheel 17 when the flywheel 17 is being driven by other power sources.

Electrically activated clutch ECC-GA is energized by controller 20 and provides engagement between flywheel 17 and clutch 16 on the drive shaft 19 connected to transmission 18.

Figure 2:
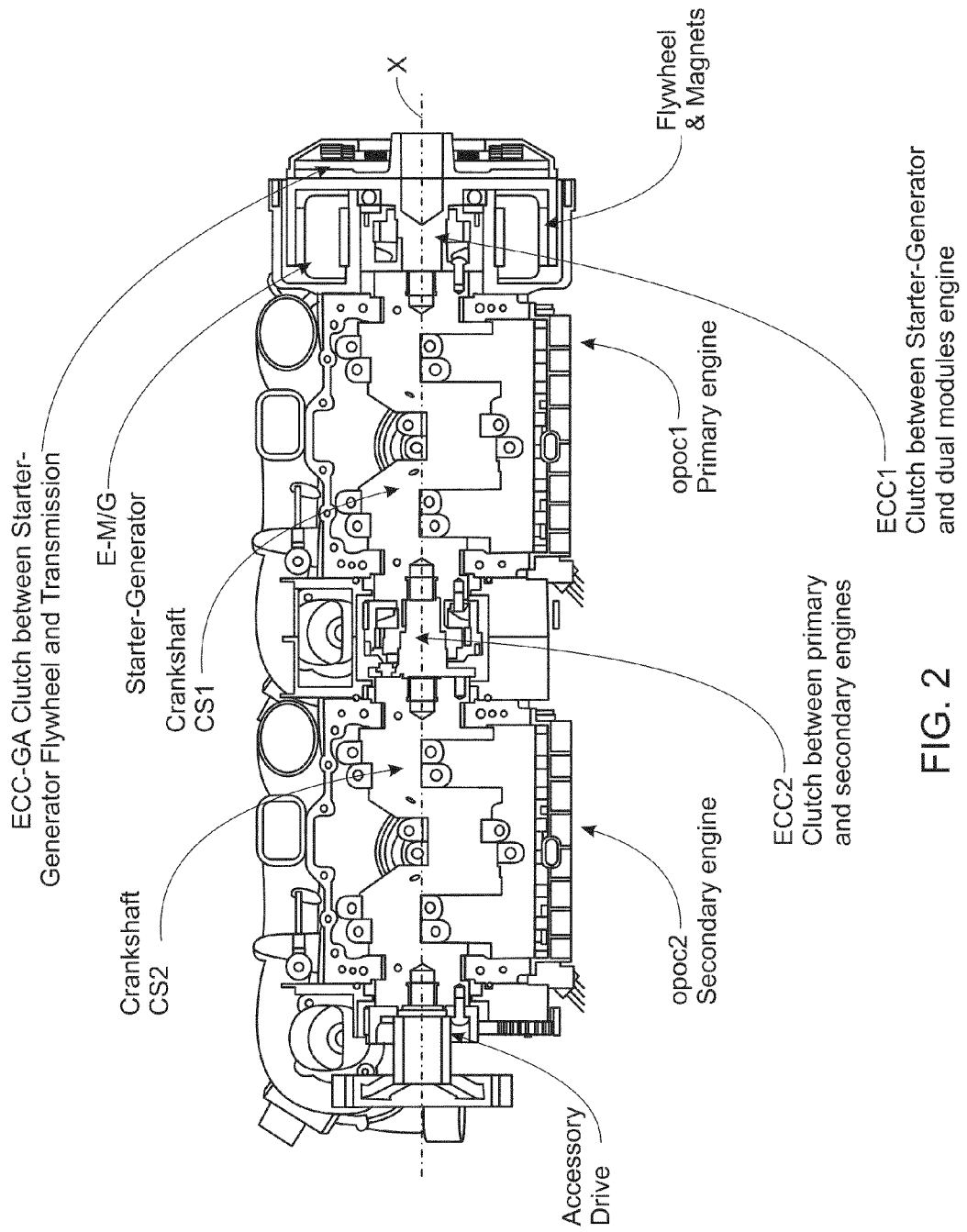
FIG. 2 is a cross-sectional view of the first embodiment of FIG. 1, taken along section line 2-2 in FIG. 3 through the crank shaft of a pair of OPOC engine modules configured for hybrid.
Figure 3:
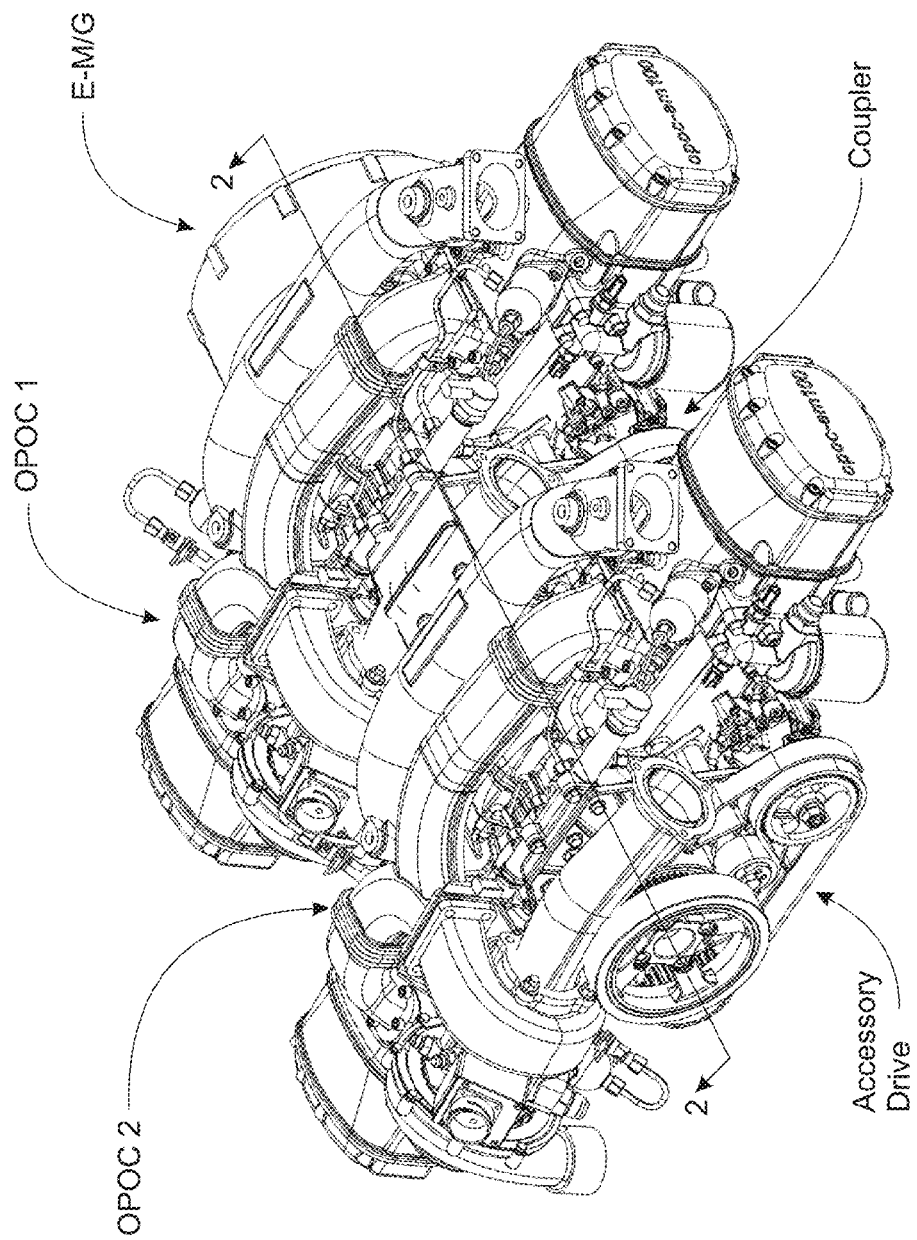
FIG. 3 is a perspective view of the first embodiment of the present invention.
Figure 4:
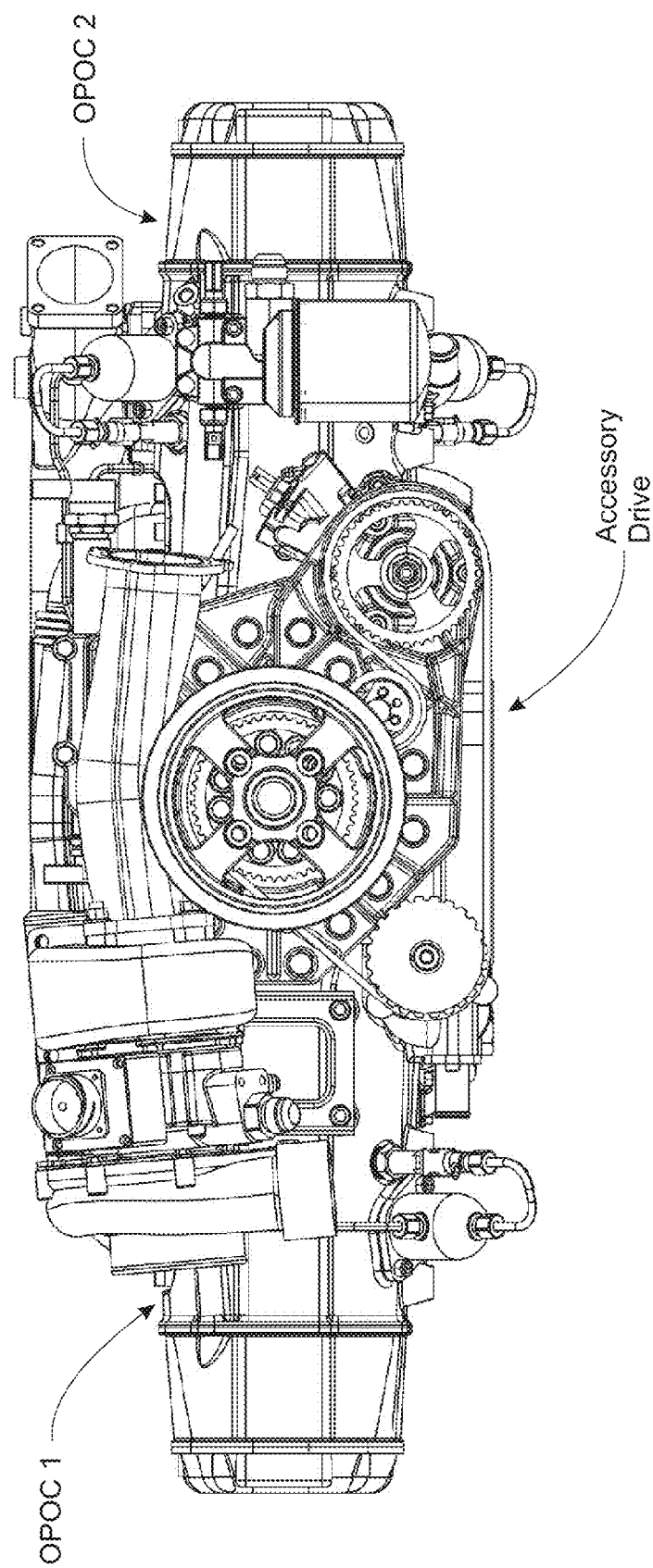
FIG. 4 is a front view of the first embodiment of the present invention shown in FIG. 3.

In FIGS. 2 and 3 and 4 the first embodiment of the present invention is shown in which primary and secondary engine modules OPOC1 and OPOC2, are physically assembled with a starter motor/generator unit E-M/G. As shown in the FIG. 2 cross-section of FIG. 3 taken along section lines 2-2, crankshafts CS1 and CS2 are both disposed along a rotational centerline axis "X", as is the Starter Motor/Generator E-M/G. At one end of crankshaft CS2, an accessory drive takeoff is provided. At the other end of crankshaft CS2, ECC2 clutch is located to provide coupling with crankshaft CS1 of engine module OPOC2. In these drawings of the first embodiment, the compact and integrated nature of the inventive concept can be appreciated.

Figure 5:
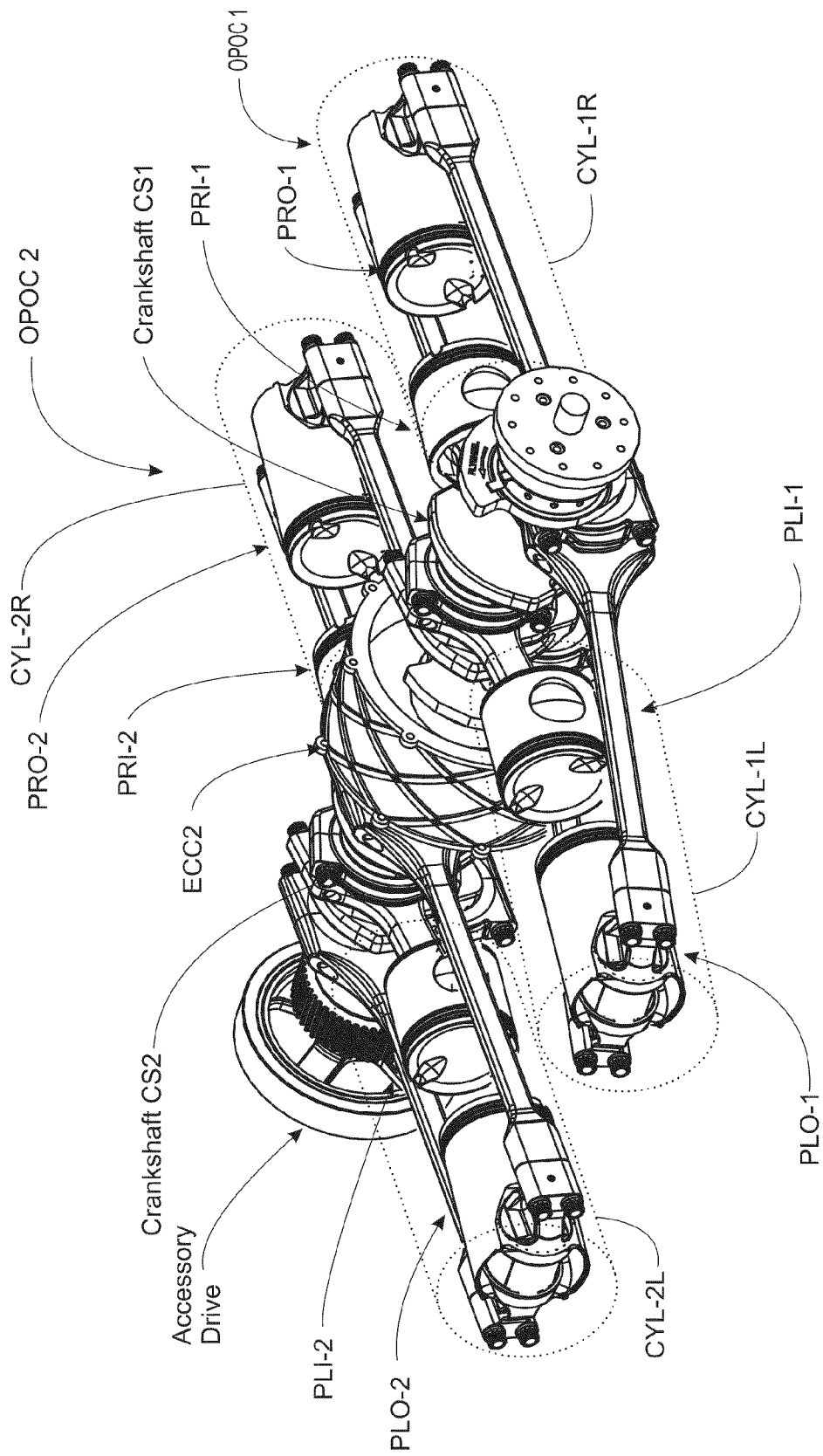
FIG. 5 is a perspective view cut-away view of a pair of OPOC engine modules showing the internal components configured for use as an embodiment of the present invention.

FIG. 5 is a cut-away view of the embodiment illustrated in FIGS. 2, 3 and 4 to show key internal moving components of the primary and secondary OPOC ICE modules, as well as the physical location of ECC2 clutch. The details of how an OPOC engine operates are not described here, since they are fully described in the above-referenced U.S. Pat. No. 6,170,443.

As shown in FIG. 5, the left and right cylinders CYL-1L and CYL-1R of primary OPOC1 engine module each contain a pair of inner and outer pistons. In the left cylinder CYL-1 of OPOC1 module, left outer piston PLO-1 is in opposition to left inner piston PLI-1. Similarly, but in opposite phase by 180°, the right cylinder CYL-1R of OPOC1 module, right outer piston PRO-1 is in opposition to right inner piston PRL-1. In this drawing, the pistons in OPOC1 are shown in intermediate phase positions between top dead center (TDC) and bottom dead center (BDC). Through the push rods for inner pistons and the pull rods for outer pistons, the oppositely and linearly moving pistons provide energy that causes rotation of crankshaft CS1.

With respect to the secondary OPOC2 engine module, the left cylinder CYL-2L contains left outer piston PLO-2 which is in opposition to left inner piston PLI-2. Similarly, but in opposite phase by 180°, the right cylinder CYL-2R contains right outer piston PRO-2 in opposition to right inner piston PRL-2. In this drawing, the pistons in the OPOC2 module are shown in TDC (right) and BDC (left) positions. This illustrates the 90° phase difference between the OPOC1 and OPOC2 modules that was discussed above.

Figure 6:
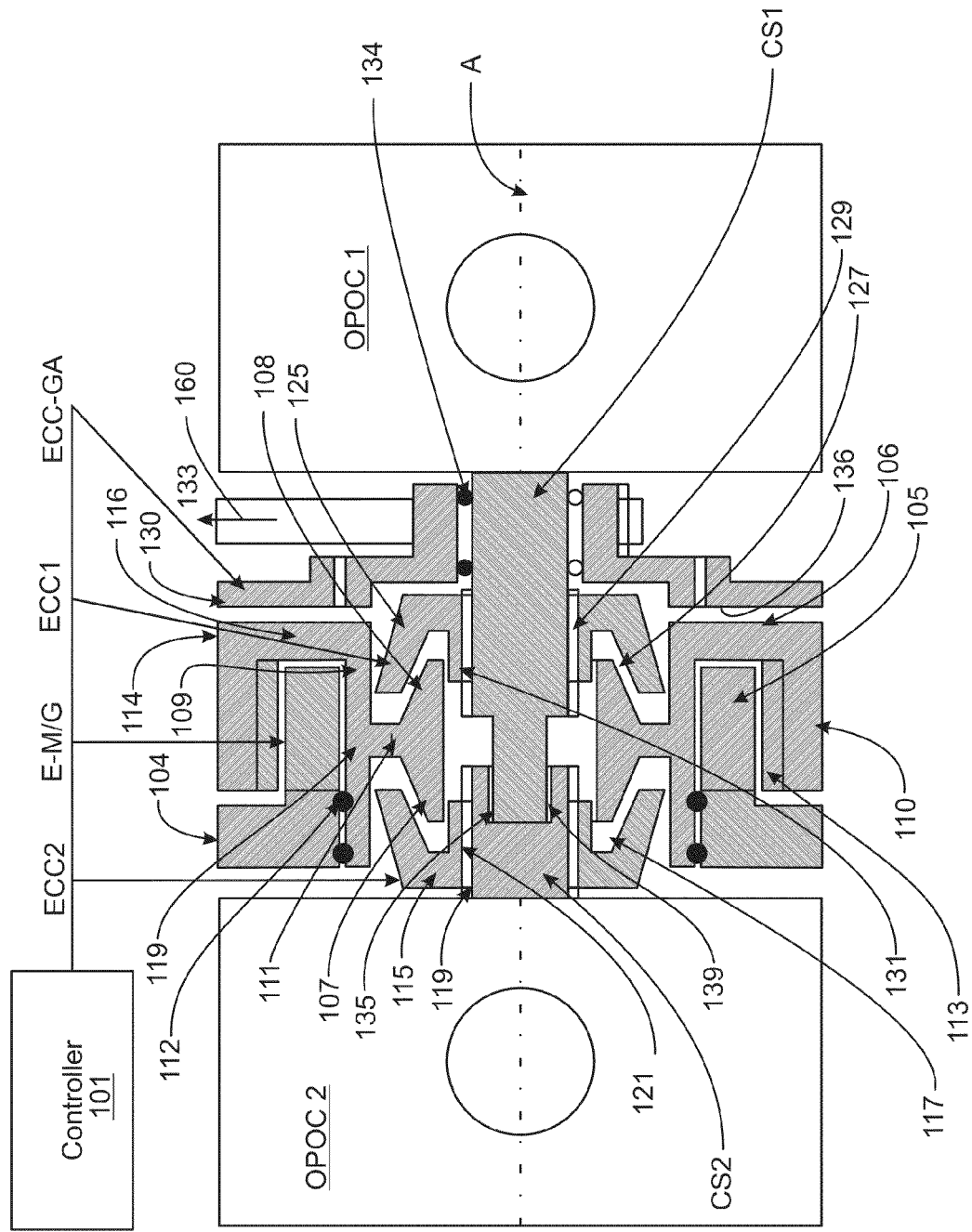
FIG. 6 is a cross-sectional view of a second embodiment of the inventive subject matter.

FIG. 6 illustrates a second embodiment of the inventive concept. In the second embodiment, the coupling system 100 for transferring power is physically located between a primary OPOC1 ICE module and a secondary OPOC2 ICE module. A Starter Motor/Generator E-M/G is also configured to have an electro-magnetic coupler between its stationary coils 105 mounted on stator 104, and permanent rotor magnets 113 mounted on rotating flywheel 110. Coupling system 100 provides power transfer between a plurality of powerable modules. In this case, the Starter Motor/Generator E-MG 104, primary engine module OPOC1 and secondary engine module OPOC2 are powerable modules and are shown with moving elements in the form of permanent rotor magnets 113 on flywheel 110, crank shaft CS1, and crank shaft CS2, respectively. Each of the moving elements are configured to rotate about a common axis "X". Crankshafts CS1 and CS2 are shown to be co-supported through a cylindrical extension 139 of CS1 inside a bore 135 in the end of CS2. This co-support is appropriately provided with bearings and/or bushings to ensure there is minimal friction between the two crankshafts while maintaining their axial alignment.

Flywheel 110 is mounted for rotation, also about the common axis X, and functions as a kinetic energy storage device and as an integrator, that sums the power input to it and provides the transfer of power output. Starter Motor/Generator E-M/G contains a first receiver in the form of stationary stator coils 105 which are electro-magnetically linked to the rotating permanent rotor magnets 113 mounted on flywheel 110. The crankshaft CS1 of primary engine module OPOC1 is linked to a second receiver in the form of a movable clutch element 125 that is mounted on splines 131 to rotate with the crankshaft CS1 and to be actuatable to slide along splines 131 in an axial direction on CS1. Clutch element 125 contains a clutch face 127 that is engagable with a corresponding face 108 on flywheel 110 in response to the ECC1 signal. The crankshaft CS2 of secondary engine module OPOC2 is linked to a third receiver in the form of a movable clutch element 115 that is mounted on splines 121 to rotate with the crankshaft CS2 and to be actuatable to slide along splines 121 in an axial direction on CS2. Clutch element 115 contains a clutch face 117 that is engagable with a corresponding face 107 on flywheel 110 in response to the ECC2 signal. The transfer of power out by flywheel 110 occurs via an actuatable coupler element in the form of ECC-GA signaled clutch 130 that engages flywheel 110 and connects the flywheel 110 via a gear, belt, chain or other torque conveyance linkage 133 to a transmission 160. Clutch 130 is mounted on crankshaft CS1 through bearings 134 which provide support while allowing for friction-free rotation with respect to crankshaft CS1. Clutch 130 contains a radial and planar clutch face 136 that is engagable with a corresponding radial and planar face 106 on flywheel 110. A switching control signal is provided by the programmable controller 101 that provides the ECC-GA switch signals to cause the engagement of the flywheel integrator with one or more receivers according to a selected power profile defining which powerable modules are to be engaged. The controller 101 may be any suitable programmable device that operates to provide electrical signals or hydraulic pressure to cause the coupler receivers to be actuated or activated in accordance with preprogrammed parameters.

Flywheel 110 is shown in FIG. 6 as an open center disk having a convoluted cross-section taken diametrically along its axis of rotation. A cylindrical axle portion 109 having an outer circular surface 119 is mounted for support and free rotation on bearings 112 located between the inside annular surface of stator 104 of Starter Motor/Generator E-M/G. Flywheel 110 includes a web extension 111 from axle 109 to form engagable angular cylindrical faces 107 and 108 that extend conically outward therefrom and towards the axis. The outer rim 114 of flywheel 110 is joined to the axle 109 by a radial portion 116 and has the permanent rotor magnets 113 attached to the underside thereof.

Figure 7:
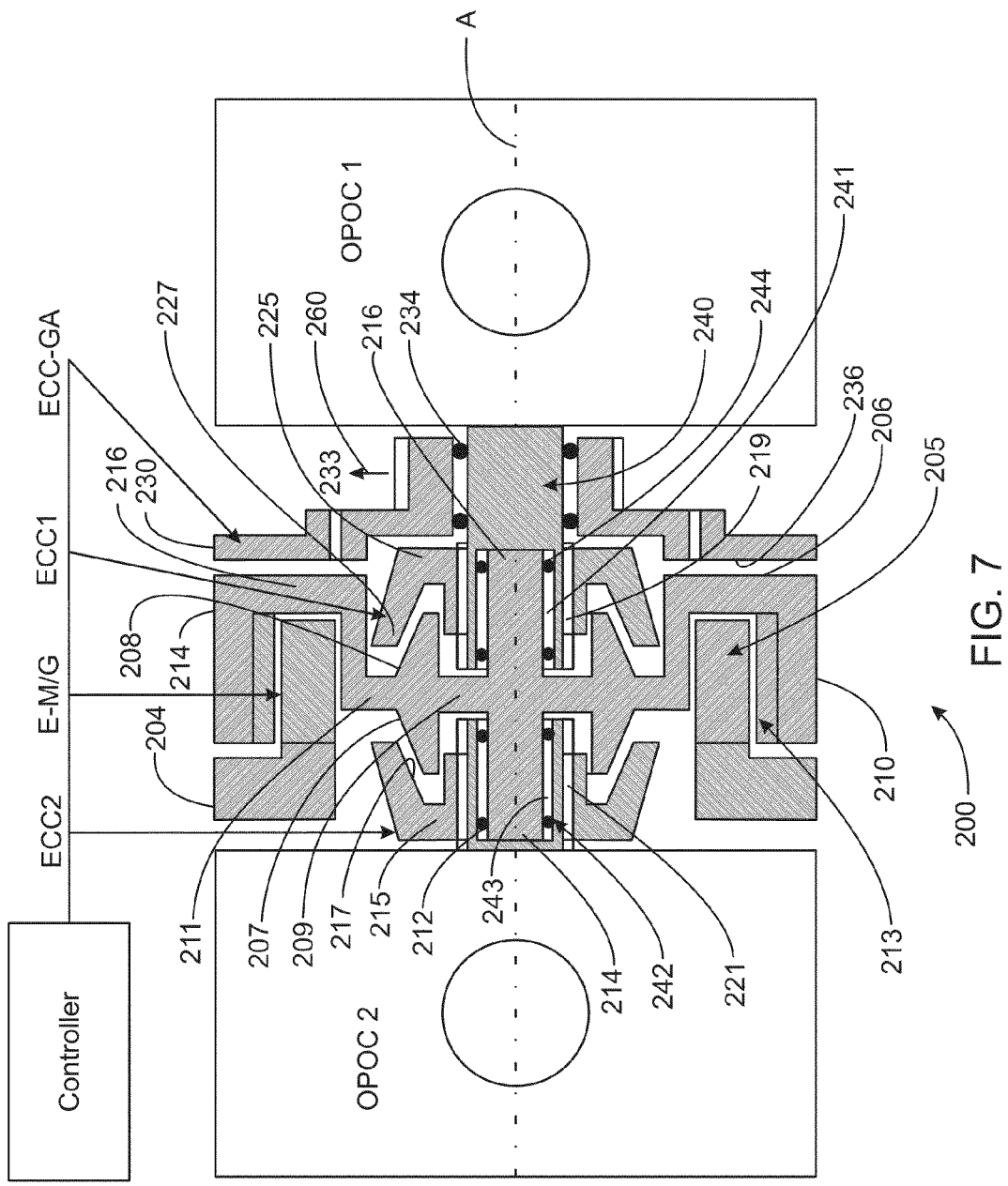
FIG. 7 is a cross-sectional view of a third embodiment of the inventive subject matter.

FIG. 7 illustrates a third embodiment of the inventive concept. In the third embodiment, the coupling system 200 for transferring power is physically located between a primary OPOC1 ICE module and a secondary OPOC2 ICE module. A Starter Motor/Generator E-M/G is also configured to have an electro-magnetic coupler between its stationary coils 205, mounted on stator 204, and rotating permanent rotor magnets 213 located physically within the integrator flywheel 210. Coupling system 200 provides power transfer between a plurality of the powerable modules. In this case, the Starter Motor/Generator E-M/G, primary engine module OPOC1 and secondary engine module OPOC2 are powerable modules and are shown with moving elements in the form of rotor magnets 213, crank shaft (CS1) 240 and crank shaft (CS2) 242, respectively. Each of the moving elements is configured to rotate about a common axis "X".

Flywheel 210 is mounted for rotation, also about the common axis X, and functions as a kinetic energy storage device and as an integrator that sums the power input to it and provides the transfer of power output. Starter Motor/Generator E-M/G contains a receiver in the form of stationary coils 205 which are electro-magnetically linked to the rotating permanent magnets 213. The CS1 crankshaft 240 of primary engine module OPOC1 is linked to a first receiver in the form of a movable clutch element 225 that is mounted on splines 219 to rotate with the CCS1 crankshaft 240 and to be actuatable to slide along splines 219 in an axial direction on CS1 crankshaft 240. Clutch element 225 contains a clutch face 227 that is engagable with a corresponding face 208 on flywheel 210 in response to the ECC1 signal. The CS2 crankshaft 242 of secondary engine module OPOC2 is linked to a receiver in the form of a movable clutch element 215 that is mounted on splines 221 to rotate with CS2 crankshaft 242 and to be actuatable to slide along splines 221 in an axial direction on CS2 crankshaft 242. Clutch element 215 contains a clutch face 217 that is engagable with a corresponding face 207 on flywheel 210 in response to the ECC2 signal. The transfer of power by the flywheel 210 occurs via an actuatable coupler element in the form of ECC-GA signaled clutch 230 that engages flywheel 210 and connects the flywheel 210 via a gear, belt, chain or other torque conveyance linkage 233 to a transmission 260. Clutch 230 is mounted on CS1 crankshaft 240 through bearings 234 which provide support while allowing for friction-free rotation with respect to crankshaft 240. Clutch 230 contains a planar clutch face 236 that is engagable with a corresponding face 206 on flywheel 210. A switching control is provided by the programmable controller 201 that provides the ECC-GA switch signals to cause the engagement of the integrator with one or more receivers according to a selected power profile defining which powerable modules are to be engaged.

Flywheel 210 is shown in FIG. 7 as a disk with a center axle shaft and having a convoluted cross-section taken diametrically along its axis of rotation. A central axle has symmetric cylindrical shaft portions 214 and 216 extending from its balanced center. Axle shaft portions 214 and 216 are mounted for free rotation on bearings 244 and 212 within bores 241 and 243 in respective CS1 crankshaft 240 and CS2 crankshaft 242. Flywheel 210 includes a radial web extension 209 from its axle to form engagable angular cylindrical faces 207 and 208 that extend conically outward therefrom. The outer rim 214 of the flywheel 210 is joined to the extension 209 by a radial portion 216 and has the permanent rotor magnets 213 attached to the underside thereof.

The key distinction of the third embodiment from the second embodiment is the configuration and mounting of the flywheel with respect to the axially aligned crankshafts of the primary and secondary engine modules.

Figure 8:
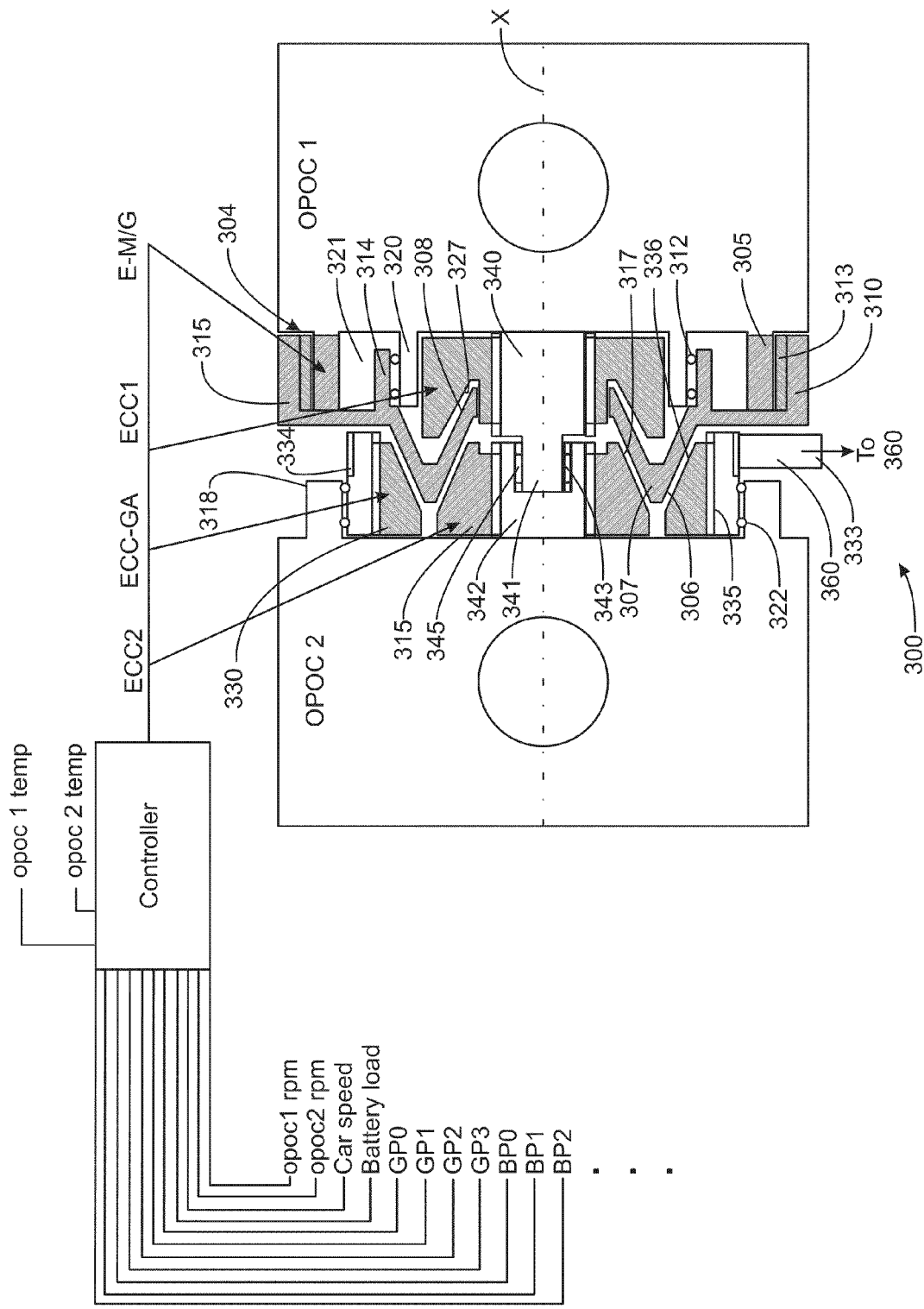
FIG. 8 is a cross-sectional view of a fourth embodiment of the inventive subject matter.

A fourth embodiment is shown in FIG. 8 and allows a more compact arrangement for a coupler system 300 by providing annular bearing race supports on the engine module housings. In this case, the annular bearing support 320 is provided on the primary engine module OPOC1. Annular bearing support 320 serves as an axle that supports bearings 312 and the hub 314 of flywheel 310. Annular hub 314 is formed in flywheel 310 with a relatively large diameter for mounting on bearing support 320 and allows for a greater concentration of mass towards the outer rim 315 of flywheel 310. A second annular bearing support 318 is provided on secondary engine module OPOC2 to allow a power takeoff drum 334 to be mounted for rotation on bearings 322. Take-off drum 334 contains a plurality of splines 335 for allowing axial movement of clutch receiver 330. Take-off drum 334 is associated with ECC-GA signaled clutch receiver 330 and the two elements rotate together when engaged with integrator flywheel 310. A third annular support 321 is formed on primary engine module OPOC1 and supports stationary coils 305 and function as the stator of Starter Motor/Generator E-MG 304. This embodiment integrates the stator portion of the starter motor/generator function onto the housing of the primary engine module OPOC1. The crankshafts 340 and 342 are nested, as in the second embodiment, but because of the integration of the starter motor onto the housing of an engine module, the distances between the engines can be reduced, as well as the length of each crankshaft.

Figure 9:
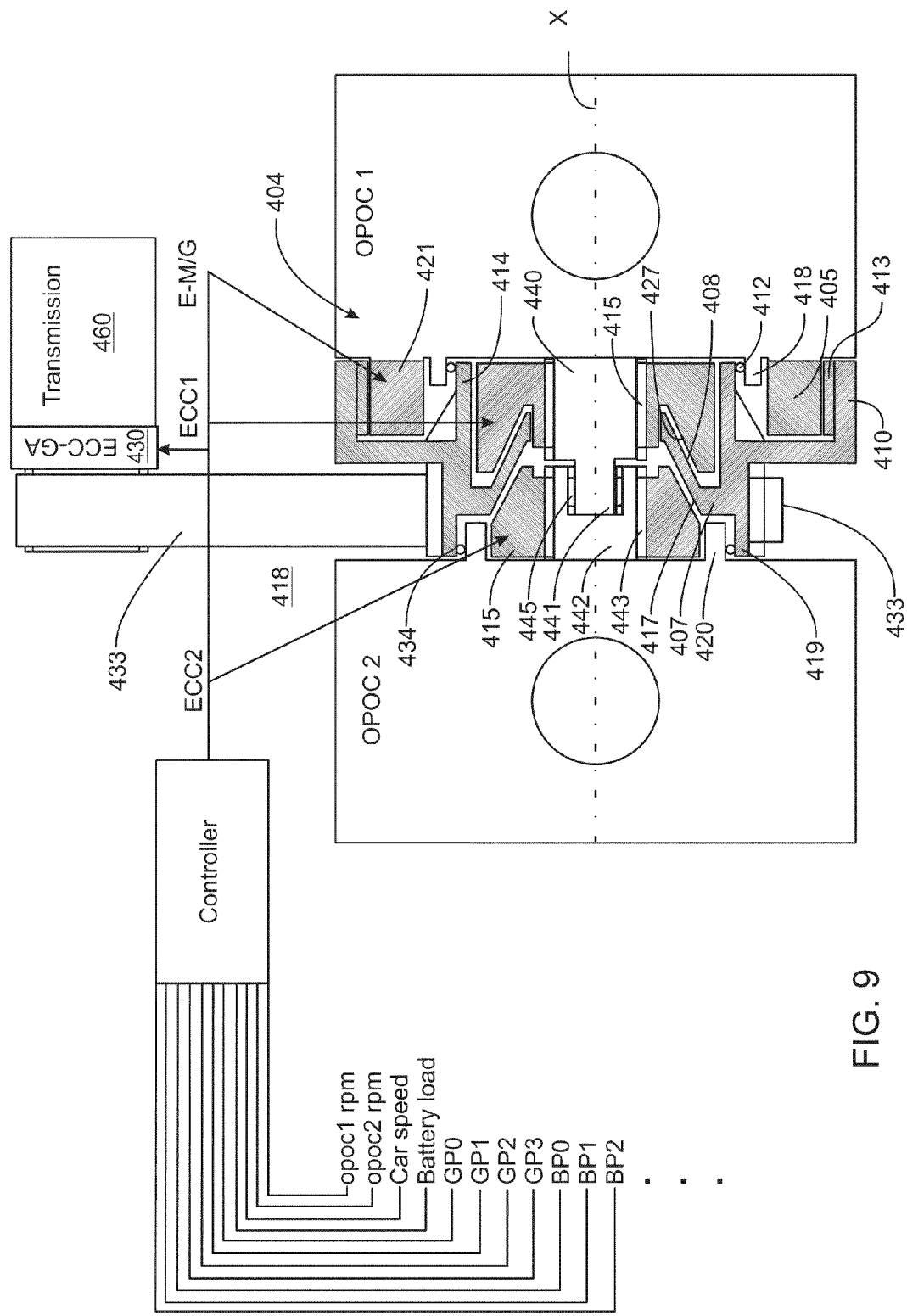
FIG. 9 is a cross-sectional view of a fifth embodiment of the inventive subject matter.

A fifth embodiment is shown in FIG. 9 and provides another compact configuration in coupling system 400. In the fifth embodiment, flywheel 410 is mounted for free-wheeling rotation on two annular bearing supports 418 and 420 respectively extending from the housings of the primary and secondary engine modules OPOC1 and OPOC2. Similar to the fourth embodiment, a stator 408 of Starter Motor/Generator E-M/G 404 is integrated into an engine module housing to allow a more compact package. In addition, the ECC-GA signaled coupling clutch 430 is remotely located with the transmission. This configuration may be desirable where engine compartment volume and dimensions do not allow for the other embodiments.

Figure 10:
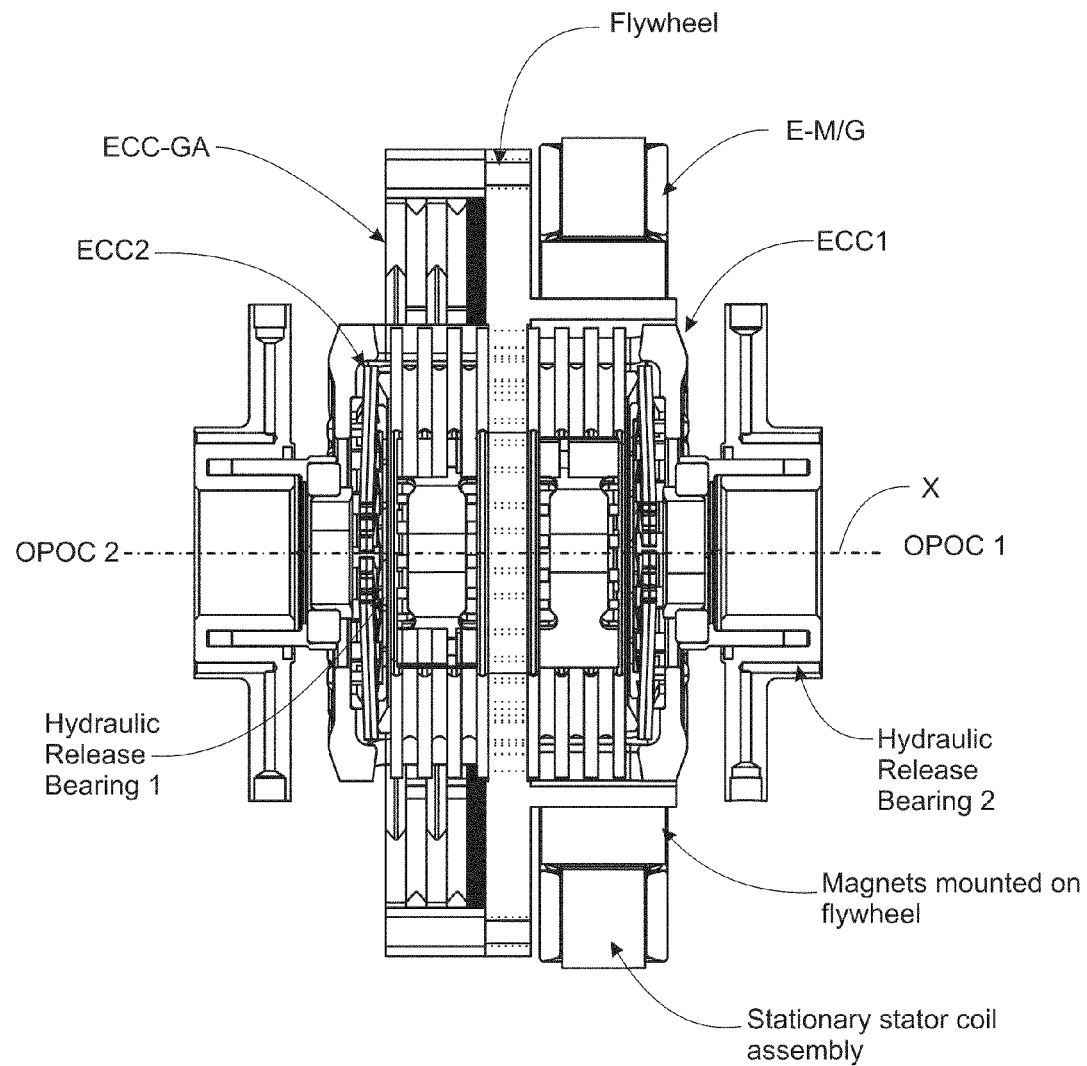
FIG. 10 is a cross-sectional view of a model of a sixth embodiment of the inventive subject matter.
Figure 11:
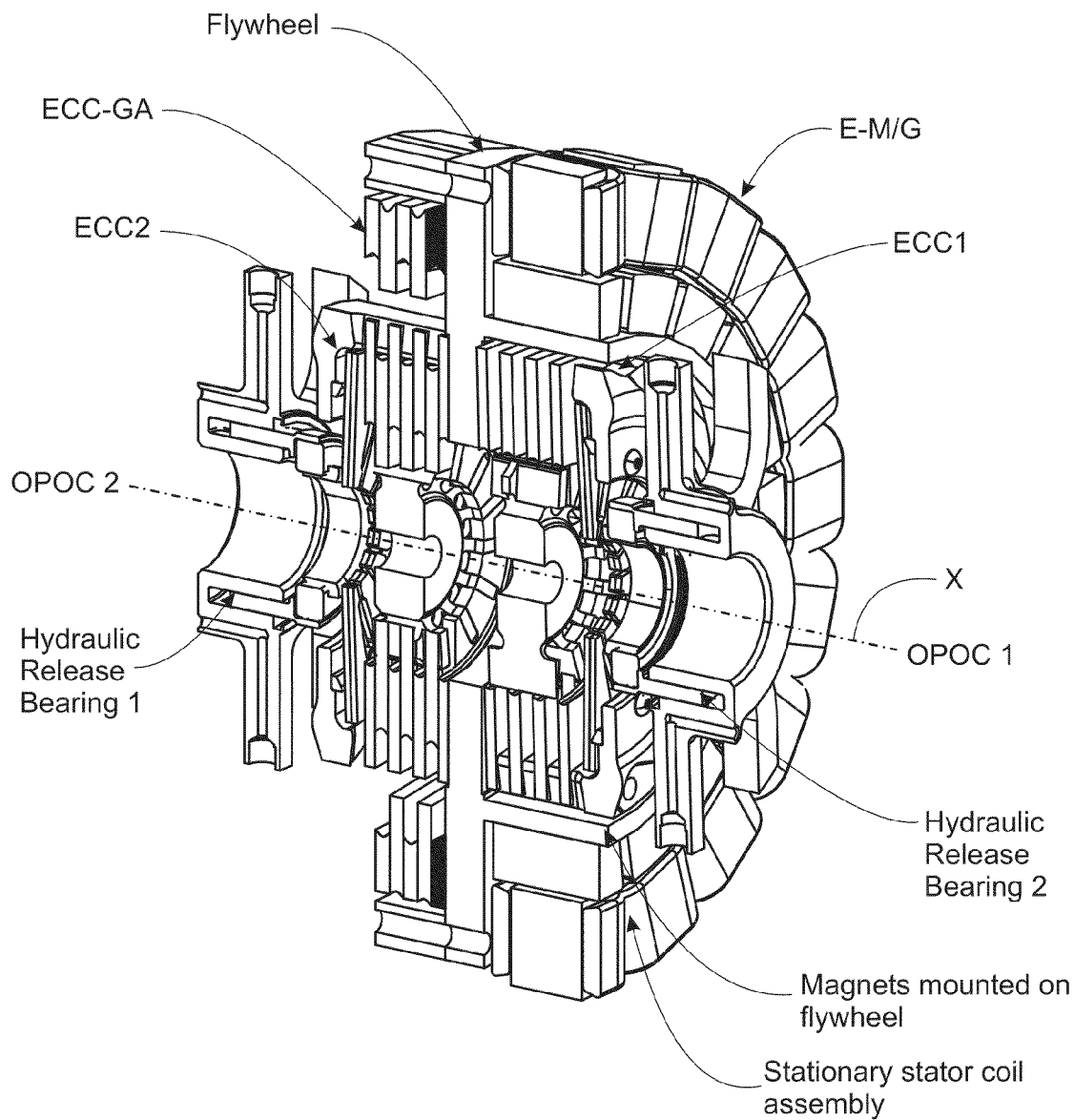
FIG. 11 is a perspective sectional view of a model of the sixth embodiment of the inventive subject matter.

A sixth embodiment of the inventive concept is shown in FIGS. 10 and 11. In this sixth embodiment, a flywheel is freewheeling mounted on the central axis X with a large surfaced disc extending towards its outer rim. The ECC1 and ECC 2 signaled clutch faces are also large to provide secure adherence to the flywheel when activated. Hydraulic release bearings are shown which act with the respective clutches to make sure no engine drag persists when the clutches are deactivated.

Figure 12:
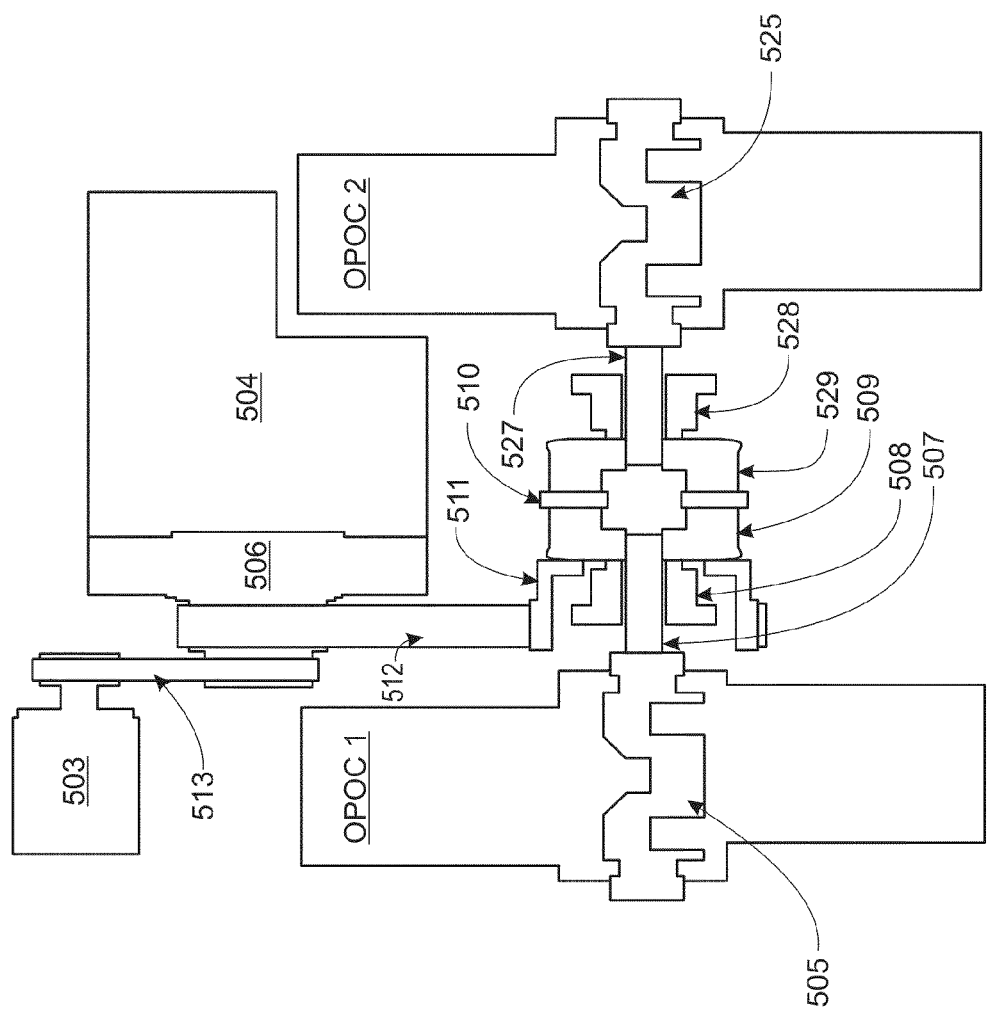
FIG. 12 is a conceptual representation of a seventh embodiment of the inventive subject matter of the present invention.

A seventh embodiment is shown in FIG. 12 wherein the key elements are represented. Primary engine module OPOC1 has a crankshaft 505 that has a take-off shaft 507 that is axially aligned with similar elements of secondary engine module OPOC2. A first clutch element 508/509 is engagable with a clutch plate 510 to connect the primary OPOC 1 through a take-off drum 511 and belt drive 512 to a flywheel 506 that is engagable with a transmission 504. OPOC2 has a crankshaft 525 that has a take-off shaft 527. A second clutch element 528/529 is engagable with a clutch plate 510 to connect the secondary OPOC in tandem with the primary OPOC module. A starter motor/generator 503 is remotely located from the engine module couplings, but is nevertheless coupled to the flywheel through belt drive 513 and an engagable third clutch within the belt drive to the flywheel 506.

While the following description of the inventive embodiments refer to a "gas pedal" as the speed control interface device, it is understood that other speed interface devices, such as joy sticks, trackballs, hand levers, hand grips, cruise control systems, touch screens and automatic braking systems also may be used to provide similar functionality.

Figure 13:
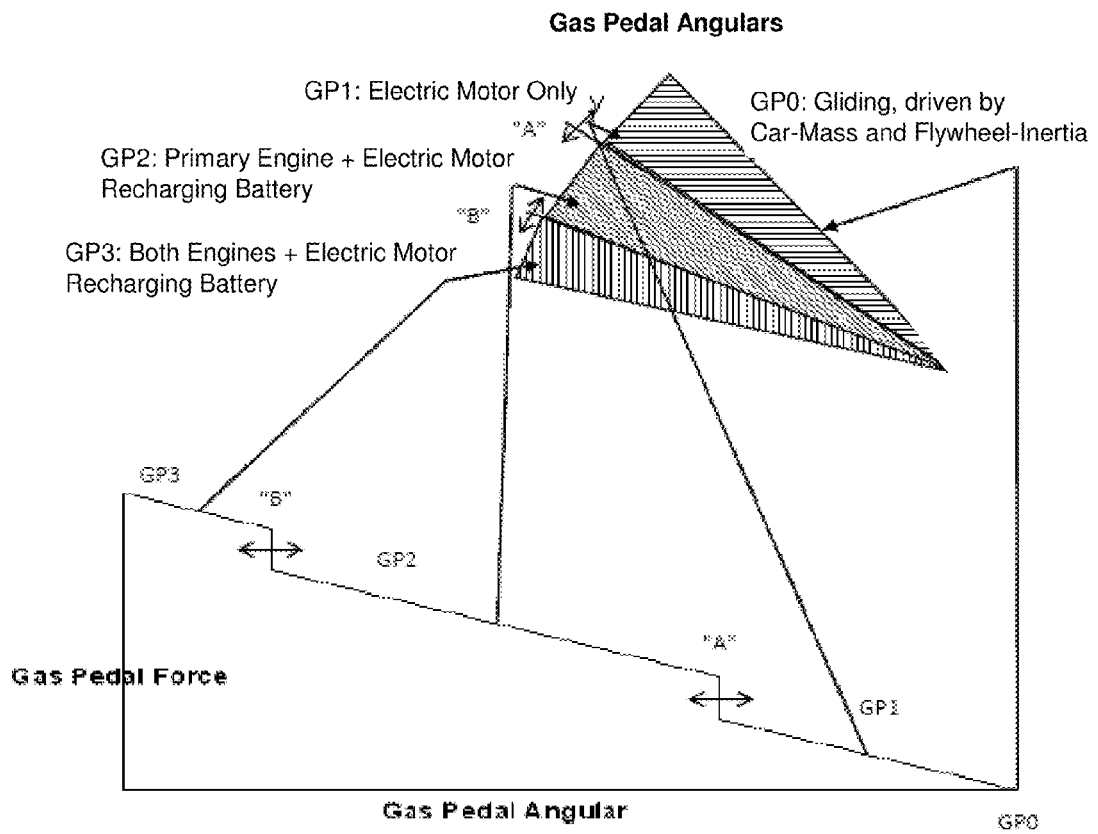
FIG. 13 is a plot showing an example of an operational control based on a gas pedal scenario during coasting and acceleration.

In operation, the embodiments are controlled to follow a predetermined set of parameters (or profile) to ensure a reliable, responsive and efficient performance. The plot in FIG. 13 illustrates the general scenario of an activation profile of the inventive subject matter during vehicle coasting and various degrees of speed and acceleration demand. The bottom stepped plot is divided into 3 ranges of throttle activation at break points "A" and "B". (Of course, many more or less break points can be used to program an operational profile. This description is an example of the principles involved.) In this case, operation is exemplified based on a typical foot "Gas" pedal as a speed demand control device in which depression is measured in an angle from rest to generate a speed demand signal. In a condition where there is no depression of the gas pedal (GP0), none of the OPOC ICE modules are engaged or running. Also, there is no drag offered by the Starter Motor/Generator E-M/G, since it is not electrically engaged. However, the flywheel is engaged to the transmission through the ECC-GA signaled coupling. Any residual kinetic inertia energy that was present in the flywheel and the mass inertia of the vehicle when the gas pedal was restored to a no depression GP0 position is provided to the transmission load through the ECC-GA signaled coupling. (However, to increase fuel efficiency, when the depression is at GP0, one can employ a "glide" type transmission that disengages from the drive wheel(s) and allows them to free-wheel.) As the gas pedal is depressed at a range of low angles and low forces in the GP1 range, the Starter Motor/Generator E-M/G is energized as a drive motor from battery voltage to spin up the flywheel to a predetermined speed that provides drive power through the ECC-GA signaled coupling to the transmission load. As the gas pedal is further engaged at an intermediate range of angles and forces in the GP2 range, the primary engine module OPOC1 is started by activating the ECC1 coupling to a closed position. Energy available from the flywheel applies torque to the OPOC1 crankshaft CS1 and starts OPOC1 ICE module. Thereafter, while primary OPOC1 is engaged, it provides power to the flywheel and transmission load.

Each time the GP2 range is entered and the ECC1 signaled coupling is closed, the Starter Motor/Generator E-M/G and primary engine module OPOC1 may be used together, in tandem, to provide combined drive power to the flywheel and transmission load, or the OPOC1 can be used alone. If a primary OPOC1 ICE module is used which has a relatively low power capacity, or has characteristics that require supplemental power transitionally when it is being subjected to a cold start, the E-M/G may be engaged to provide supplemental power in tandem with the OPOC1 ICE module, for at least a limited time period. On the other hand, if a primary OPOC1 engine module is used which has a relatively high power capacity or is warm from prior usage, the Starter Motor/Generator E-M/G may not be necessary for supplemental power and may be switched by the controller to function as a generator and provide recharge current back to the electrical source or be disengaged entirely to remain off-line. With the E-M/G functioning as a generator or being off-line, the primary OPOC1 ICE module is the sole source of drive power to the vehicle. There may be other design considerations that dictate some combination of tandem assist by the electric motor and recharge during the GP2 range that can be programmed into the controller.

When the driver desires to accelerate the vehicle by applying a relatively high force to the gas pedal in the high angle GP3 range, the ECC2 signaled coupling is also engaged, along with ECC1 signaled coupling, and secondary OPOC2 ICE module starts to run by the torque being applied to its crankshaft CS2. OPOC2 ICE module then adds its power contribution to the already energized primary OPOC1 ICE module. In instances where maximum power is required, Starter Motor/Generator E-M/G is also connected in tandem to add its power to the system. Otherwise, in the GP3 range, with both primary and secondary ICE modules operating together as a single engine the Starter Motor/Generator E-M/G is operated as a generator to charge the batteries. This continues until the gas pedal force is adjusted to cause EEC2 signaled coupling to open and OPOC2 ICE module to be disengaged and to stop.

Figure 14:
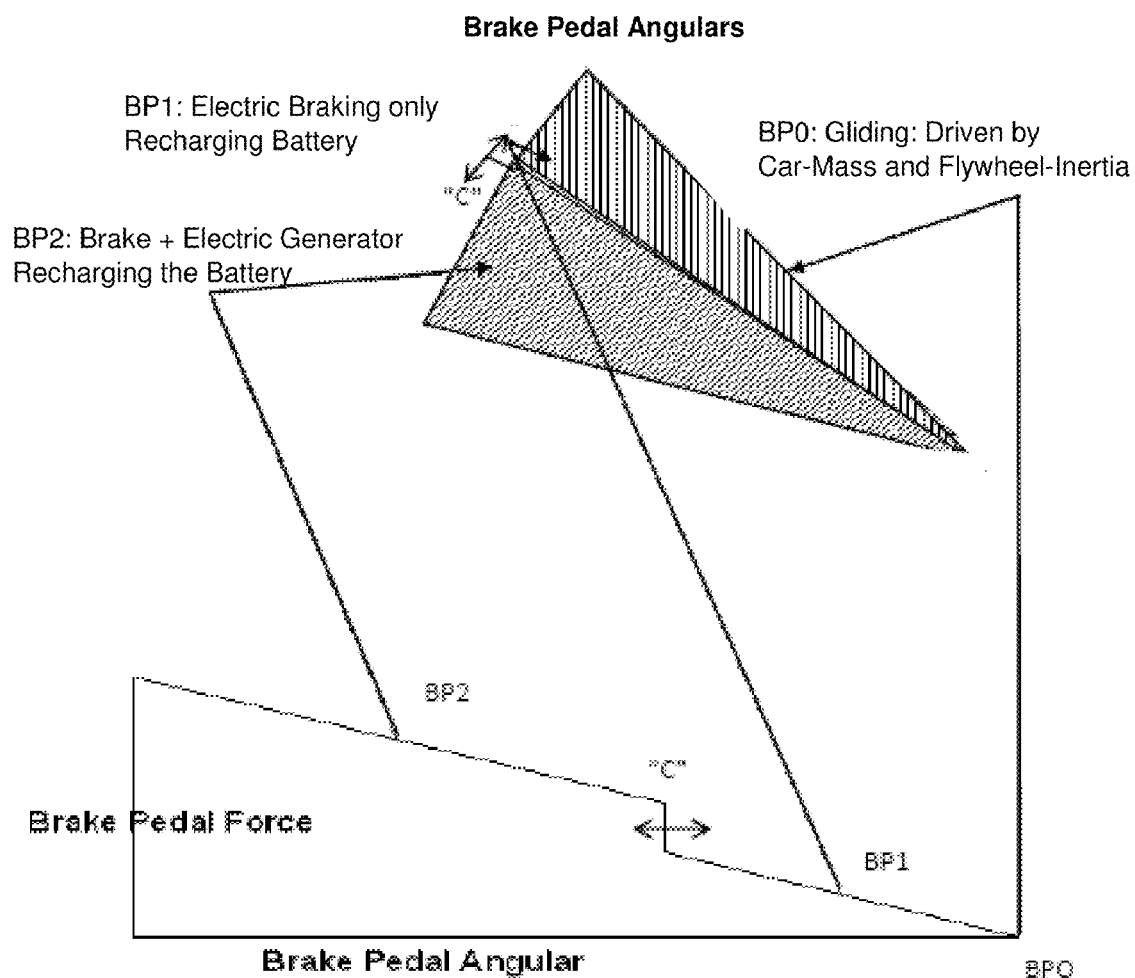
FIG. 14 is a plot showing an example of the operational control of a brake pedal scenario during coasting, deceleration and braking.

The plot in FIG. 14 illustrates the general scenario of activation of the inventive subject matter during vehicle coasting and braking. While the following description of the inventive embodiments refer to a "brake pedal" as the brake or deceleration control interface device, it is understood that other brake or deceleration interface devices, such as joy sticks, trackballs, hand levers, hand grips, cruise control systems, touch screens and automatic braking systems also may be used to provide similar functionality.

In this scenario example, the braking effort is divided into two ranges. When the vehicle is coasting and no brake pressure is applied to the brake pedal (BP0), both primary and secondary ICE modules are disengaged and stopped, the vehicle is coasting and coasting due to the mass inertia of the vehicle and either flywheel inertia or free-wheeling if a glide type transmission is employed. In the first low range (BP1) when relatively low force is applied to the brake pedal, only electric "regenerative" braking occurs, by using the E-MG as a generator connected to recharge the battery. This regenerative braking is applied through the transmission drive train to slow the vehicle. When more immediate braking is sought by applying increased force to the brake pedal in the higher range (BP2), both mechanical/hydraulic brakes connected directly to the vehicle wheels and regenerative braking applied to the drive train are applied. Of course one could substitute other types of braking, such as electrically actuated brakes, for mechanical/hydraulic brakes as they become available and acceptable for general use and application. Other scenarios can use variations in the BP2 range when mechanical braking is used alone and regenerative braking is used to only charge the batteries.

Break points "A", "B" and "C" shown in the plots of FIGS. 13 and 14, are represented with double ended arrows to indicate that they may be programmed to be dependent on various parameters, such as but not limited to: external air temperature, mass air measurements, oxygen level, altitude, weight of load in vehicle, speed of vehicle, temperatures of engine modules, speeds of engine modules, speed of flywheel, temperature of flywheel, road conditions (uphill, downhill, flat, rough, smooth, etc.), fuel energy properties, driver selection of high fuel economy or performance, and battery charge.

FIGS. 15 and 16 provide two exemplary matrices indicating which of the variously controlled elements is engaged or disengaged in the system during certain conditions when the state of battery charge is at either maximum or minimum operational threshold levels. The FIG. 15 matrix provides the control scenario when the battery is near fully charged to at least 75% of its capacity. The FIG. 16 matrix provides the control scenario when the battery is charged to a level that is approximately 30% of its capacity or below. The main difference in the two scenarios is that when the battery charge is low, the flywheel is spun up during a pre-engine start by the E-M/G to approximately 1000 rpm; and during the following start phase, the primary engine module OPOC1 is started and remains on until conditions, such as increased battery charge and low acceleration demand, allow it to be turned off. There is room for design variation that is associated with the break points "A", "B" and "C", described in the preceding paragraph with respect to FIGS. 13 and 14, when the battery is charged at levels between those 30% and 75% thresholds selected in these matrices.

Figure 17:
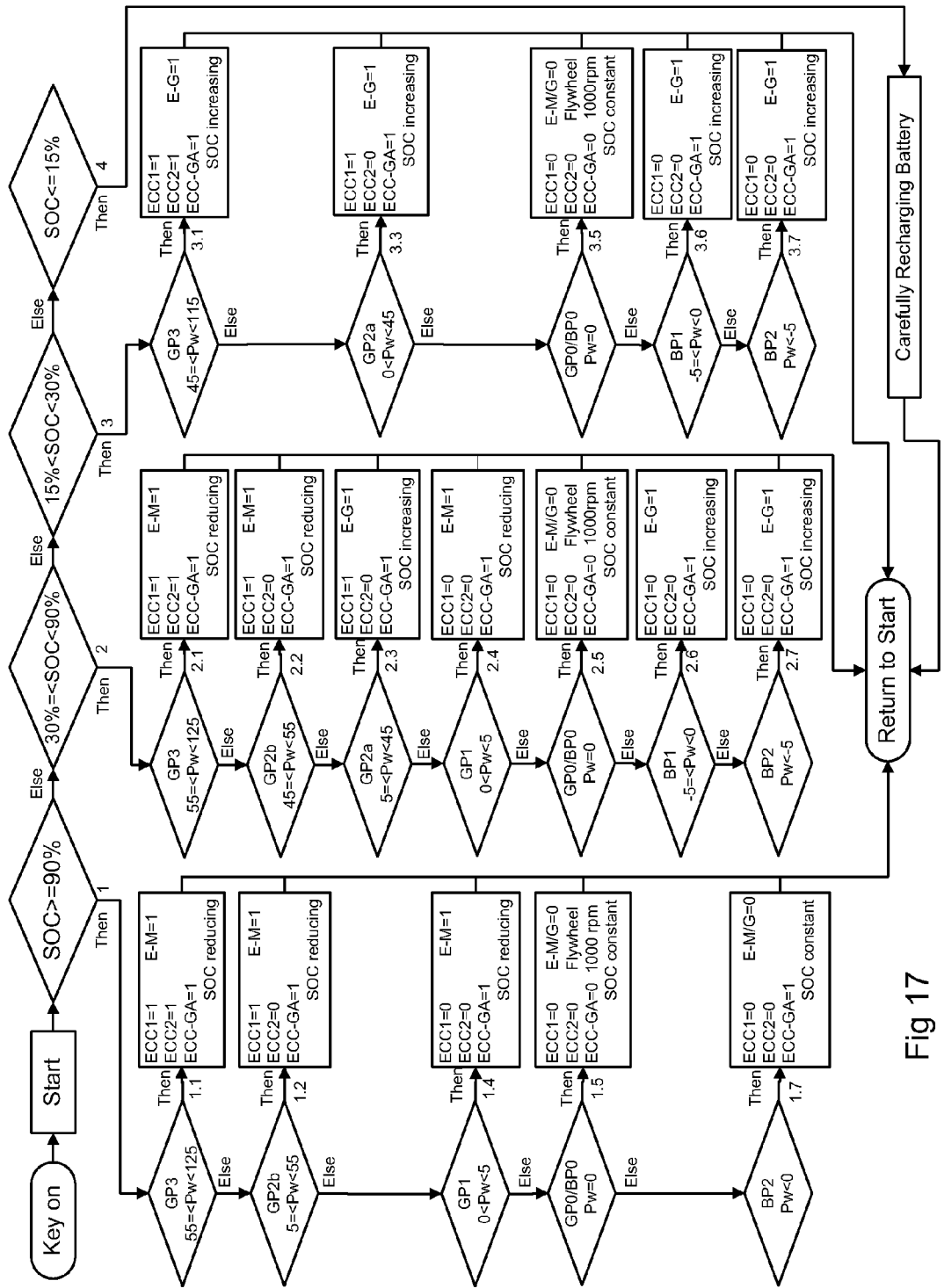
FIG. 17 is a simplified flow chart of a process for controlling the operation of the present invention.

FIG. 17 is a flow diagram of a first algorithm used to cyclically control the operation of the embodiments of the present invention. This diagram shows the control logic for the economy control mode, which is used when gas pedal accelerator is in the low to moderate range. If the gas pedal angle acceleration is greater than a predetermined critical level, the control system will enter into a kick-down mode. A "sports" mode may be provided when the maximum power is required.

For a better understanding of the flow chart in FIG. 17, the codes used therein are defined as follows:

TABLE A

| | |
|---|---|
| Primary $opoc_e$ <= | 50 kW |
| Secondary $opoc_p$ <= | 70 kW |
| Efficiency of E-M | 90% |
| E-$M_{electric\text{-}in}$ <= | 5.56 kW |
| E-$M_{mechanic\text{-}out}$ <= | 5 kW |
| Efficiency of E-G | 70% |
| E-$G_{mechanic\text{-}in}$ <= | −5 kW |
| E-$G_{electric\text{-}out}$ <= | −3.5 kW |

TABLE B

| |
|---|
| GP3: Pw = $opoc_e$ + $opoc_p$ + E-$M_{mechanic\text{-}out}$ (or E-$G_{mechanic\text{-}in}$) |
| GP2b: Pw = $opoc_e$ + E-$M_{mechanic\text{-}out}$ |
| GP2a: Pw = $opoc_e$ + E-$G_{mechanic\text{-}in}$ |
| GP1: Pw = E-$M_{mechanic\text{-}out}$ |
| BP1: Pw = E-$G_{mechanic\text{-}in}$ |
| BP2: Pw = E-$G_{mechanic\text{-}in}$ + Mech. Brake |

TABLE C

| |
|---|
| ECC1: Signal to Cutch between $opoc_e$ and flywheel [E-M/G] |
| ECC2: Signal to Cutch between $opoc_p$ and flywheel [E-M/G] |
| ECC-CA: Signal to Cutch between Transmission and flywheel |
| E-M/G: Motor/Generator |
| E-M: E-Motor |
| E-G: Generator |
| Engaged/Closed = 1 |
| Disengaged/Open = 0 |

TABLE D

| | |
|---|---|
| Start/Restart: | $n$Start = 1,000 rpm |
| GP2/GP3 Inertia Start with $n_{start}$ if SOC < 20% | |
| GP0/BP0 −> E-M keeps Flywheel at $n_{start}$ rpm | |

With the ignition switch "Key" turned on, the procedure in FIG. 17 enters the Start routine to determine which couplings should be engaged based on the state of charge "SOC" of the battery. Other factors such as temperature or the engine coolant and ambient air, for instance, could be used as additional factors. However, for this example, only State of Charge is being considered. This is a reiterative routine and is cyclically repeated at a predetermined cycle rate throughout the time the system is in operation and is not restricted to initial start up.

To begin, the SOC is measured to determine its charge threshold level. In this example, four threshold level ranges are used to determine whether the couplings will be activated or deactivated to either engage the E-M/G as a motor to provide power and allow the SOC to be in a "reducing" state; to disengage the E-M/G and allow the SOC to remain "constant"; or to configure the E-M/G as a generator E-G and cause the SOC to be "increasing". In the most severe condition, when the SOC is determined to be at or below 15%, the system enters a "carefully recharging" mode in which slow charging of the batteries takes place. The carefully charging mode is normally considered to be a constant current and constant voltage but at a current rate that is 1× the capacity of the battery at its amp/hr rating.

The SOC determination is the first filter in the process. Secondly, the defined power demand is determined based on the gas pedal (GP) and brake pedal (BP) positions. (In this flow chart, the settings for gas pedal and brake pedal positions are different than those exemplified in FIG. 13.) Here, GP3, GOP2*b*, GP2*a*. GP1, and GP0 are sub-ranges of the entire range of power demand settings for the gas pedal. Likewise, BP0, BP1 and BP2 are expressed as power sub-ranges of braking power demand settings for the brake pedal. These are achieved when the modules as set forth in Table B are coupled together. It can be seen from the flow chart in FIG. 17 that after it is determined that the SOC is high, greater than 90%, the ranges of definition for the various switch points are broader in range than they are when it is determined that the SOC is in the mid-range between 30% and 90%. This is because when the SOC is high, there is no need to charge the battery. However, in the mid range, there may be a need to charge, except when the demands on the system are high (GP3 and GP2*b*). In each case, the filtering process first looks for the highest demand and works its way down towards the minimal demands. After the second filter, determination is made as to which couplings are energized and therefore which power modules are activated to power the vehicle.

Figure 18A:
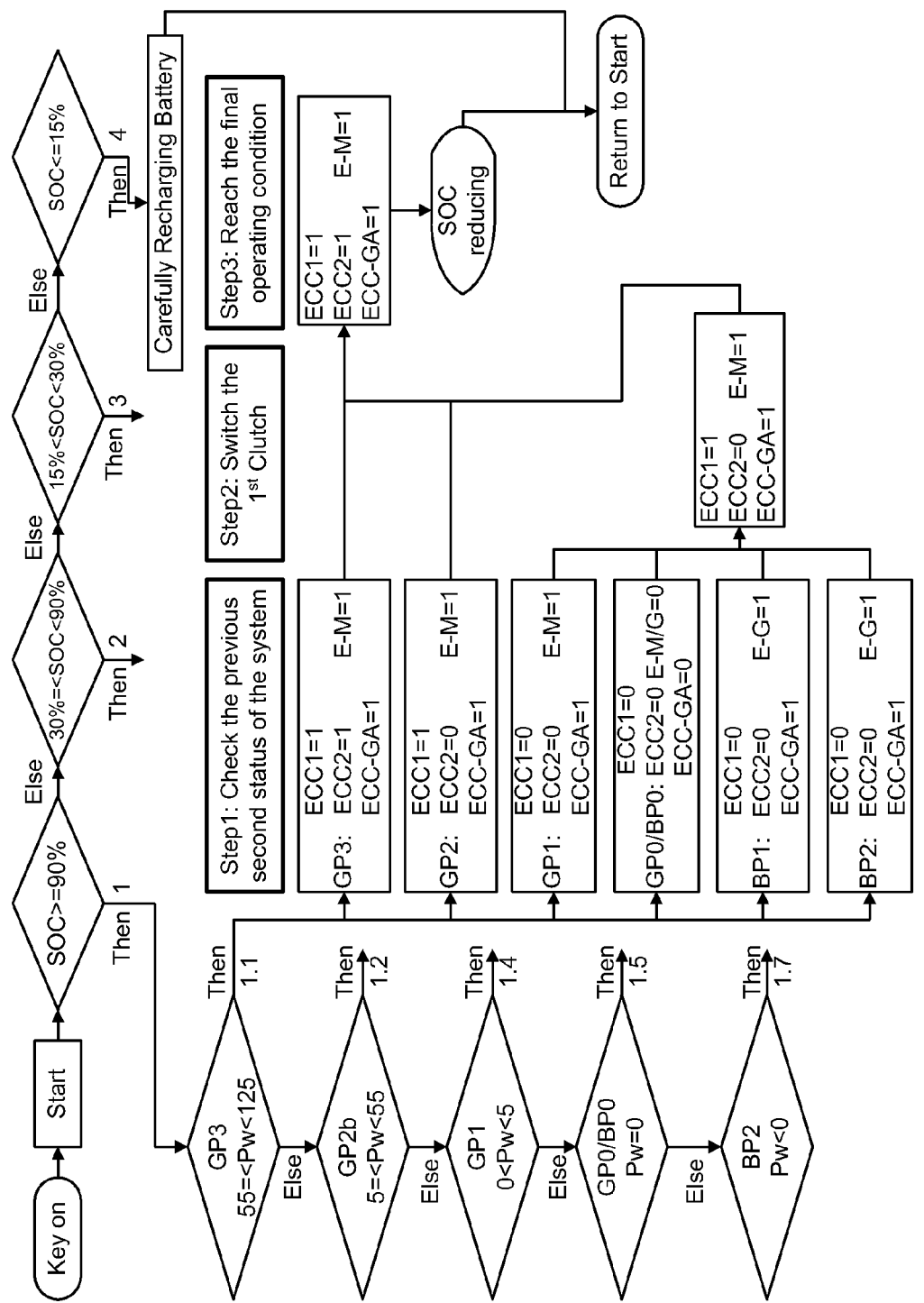
FIGS. 18A-18Q constitute a more detailed flow chart of the process used for controlling the operation of the present invention.
Figure 18B:
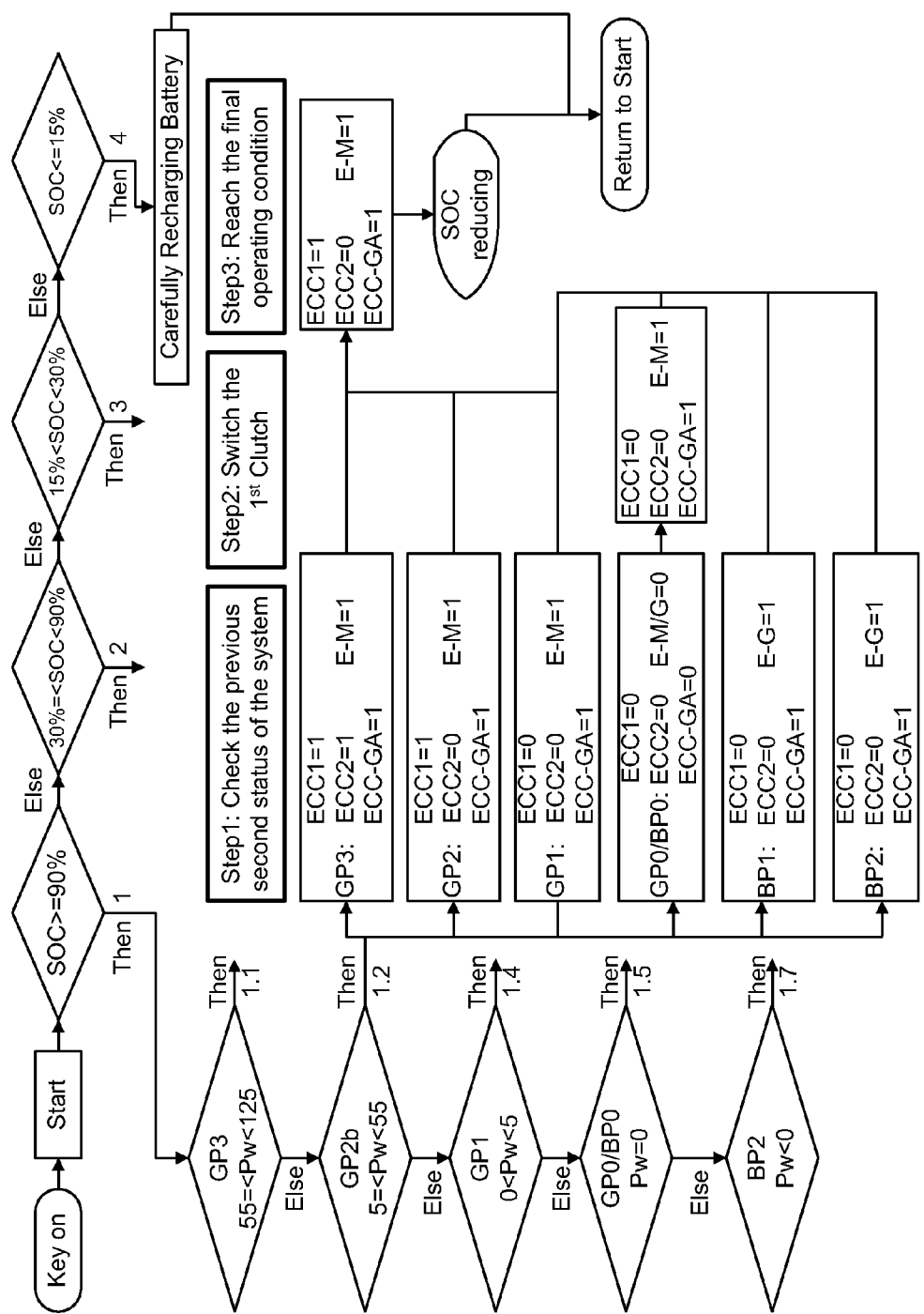
Figure 18C:
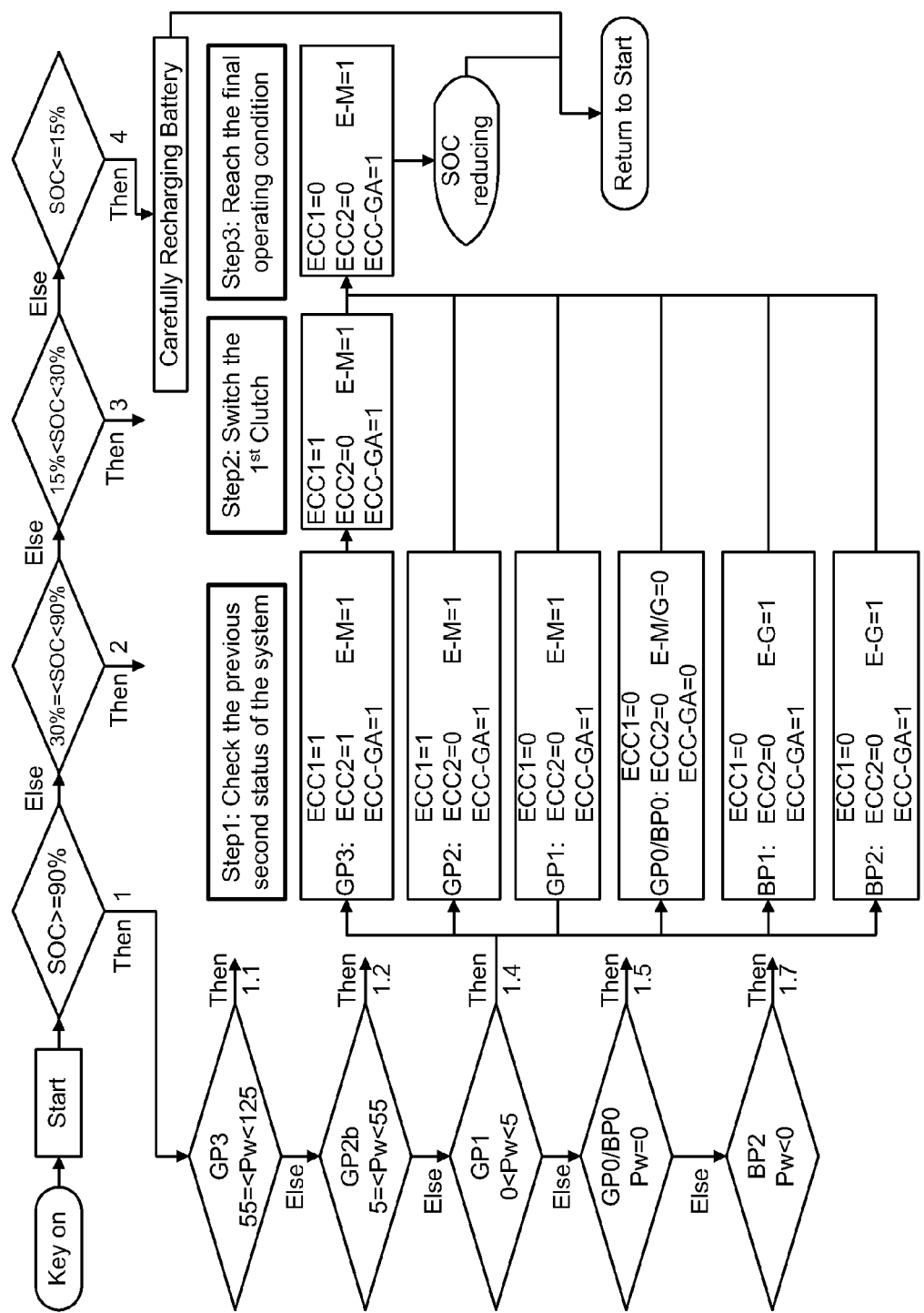
Figure 18D:
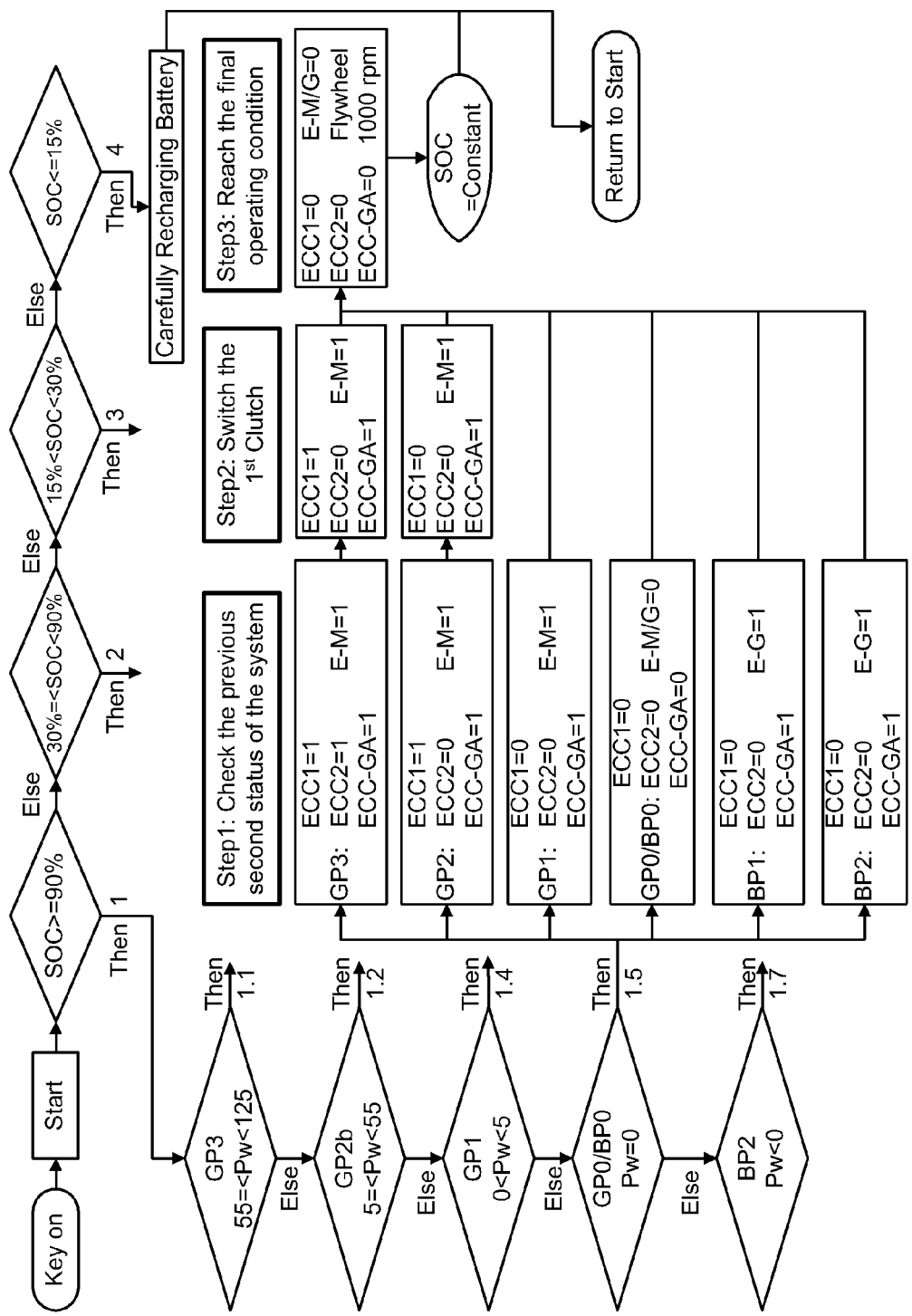
Figure 18E:
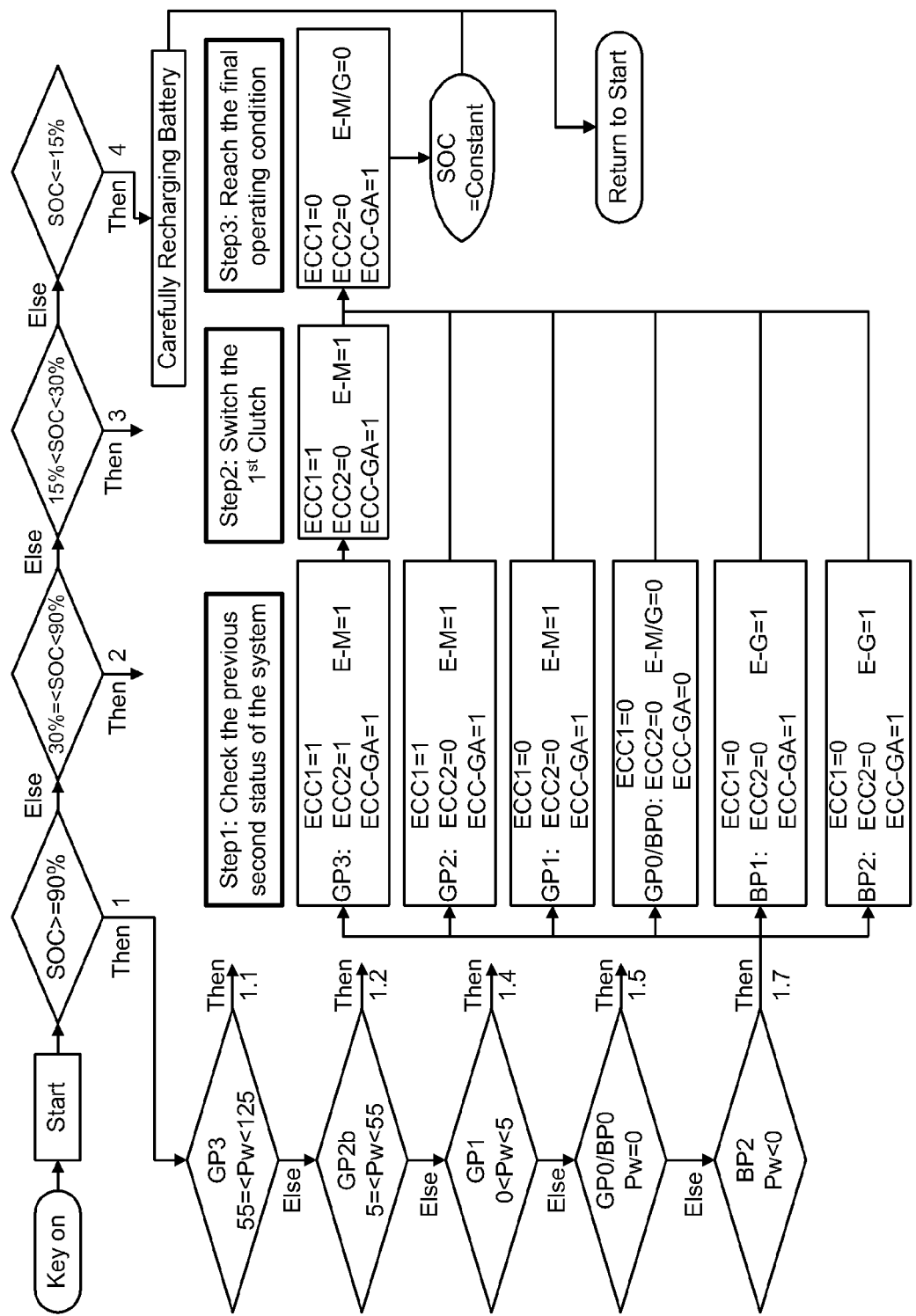
Figure 18F:
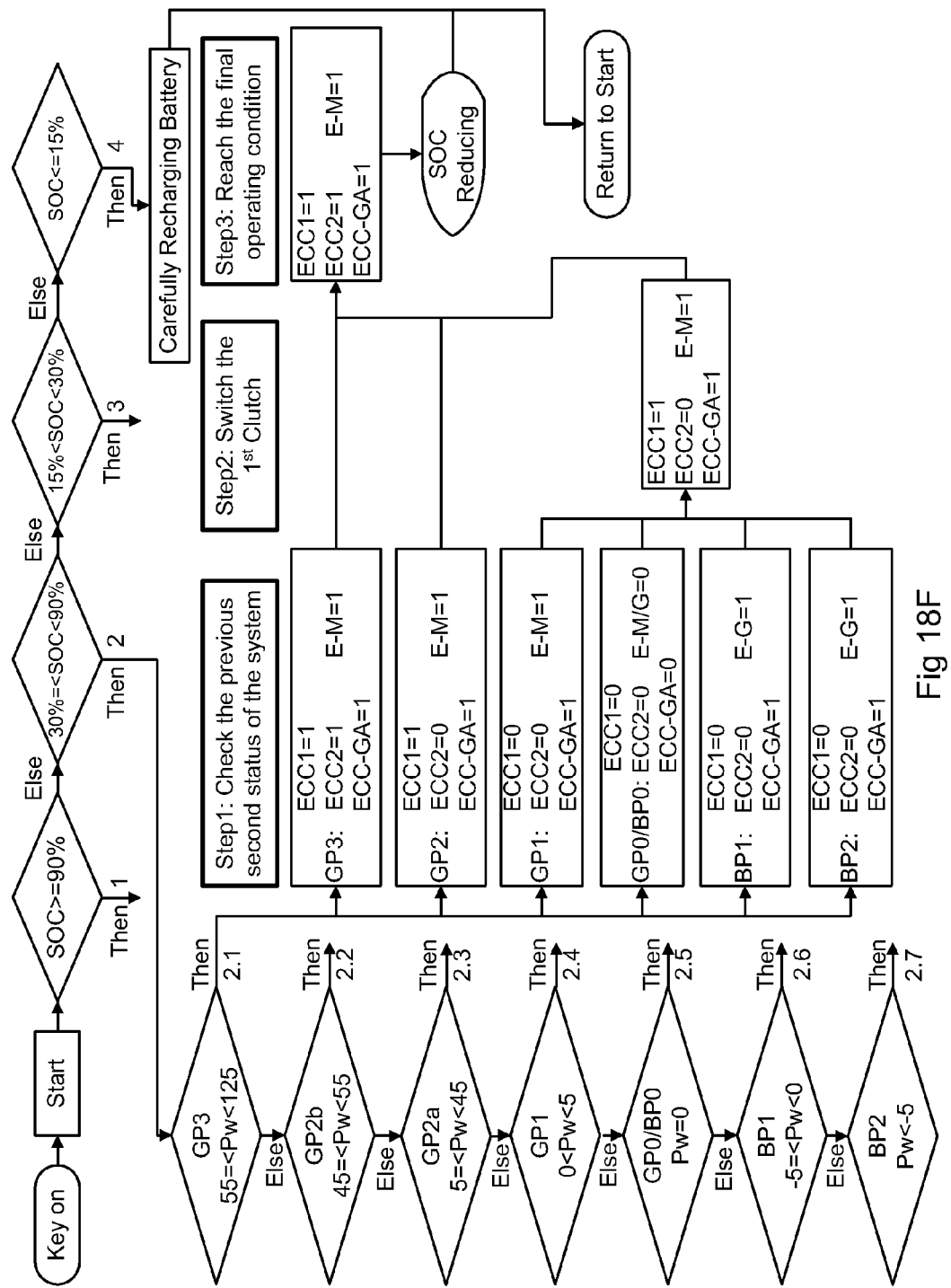
Figure 18G:
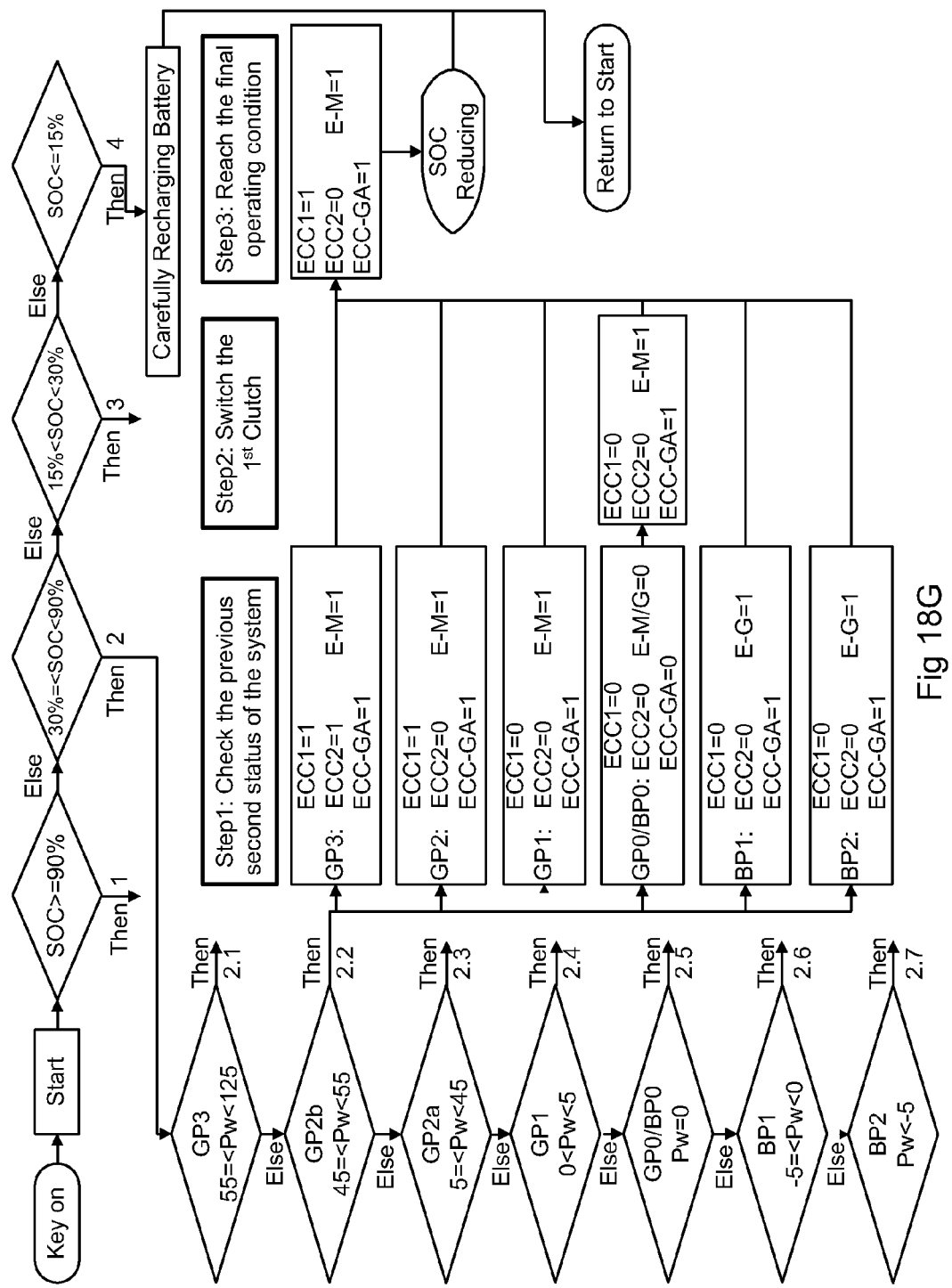
Figure 18H:
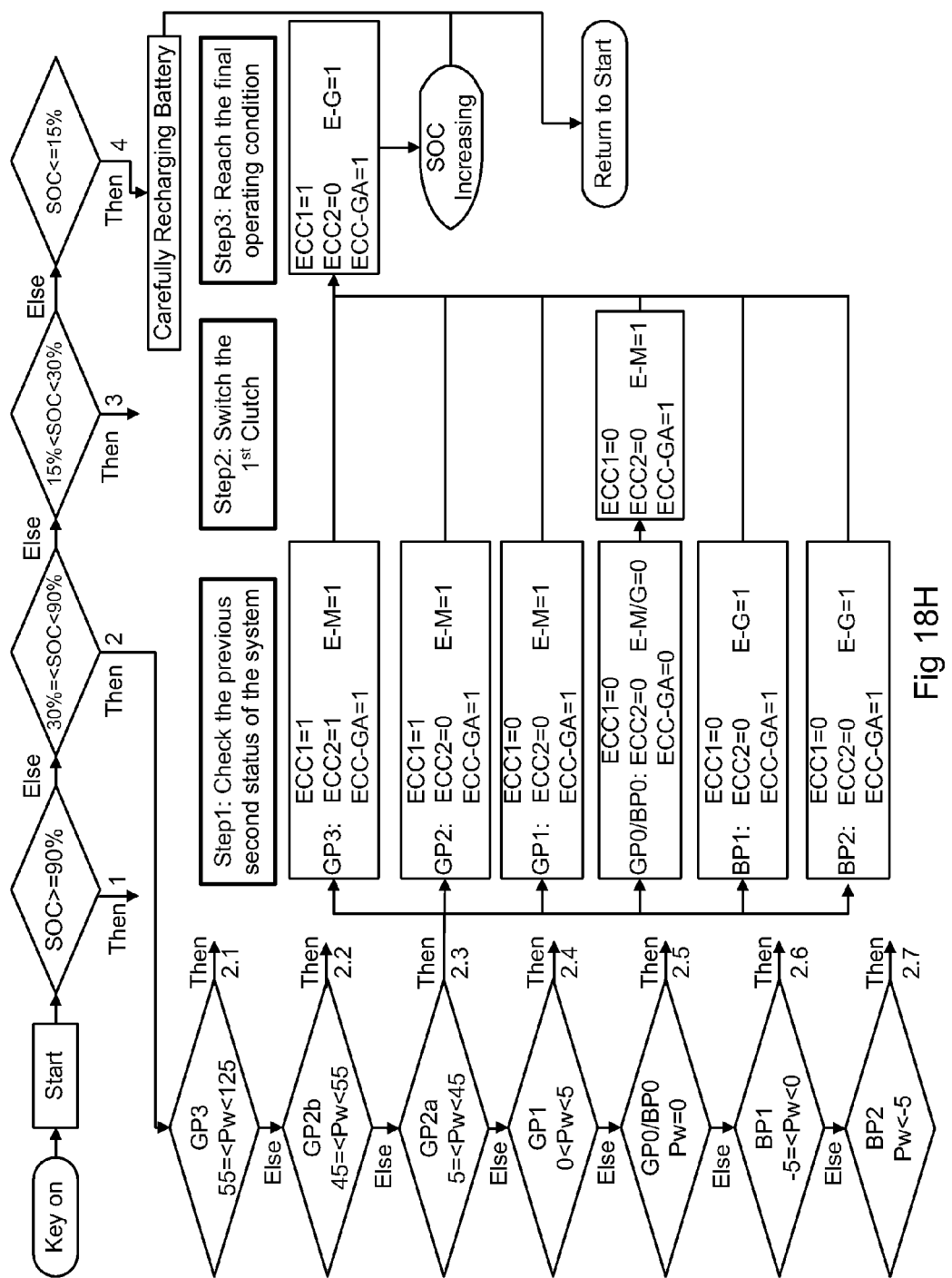
Figure 18I:
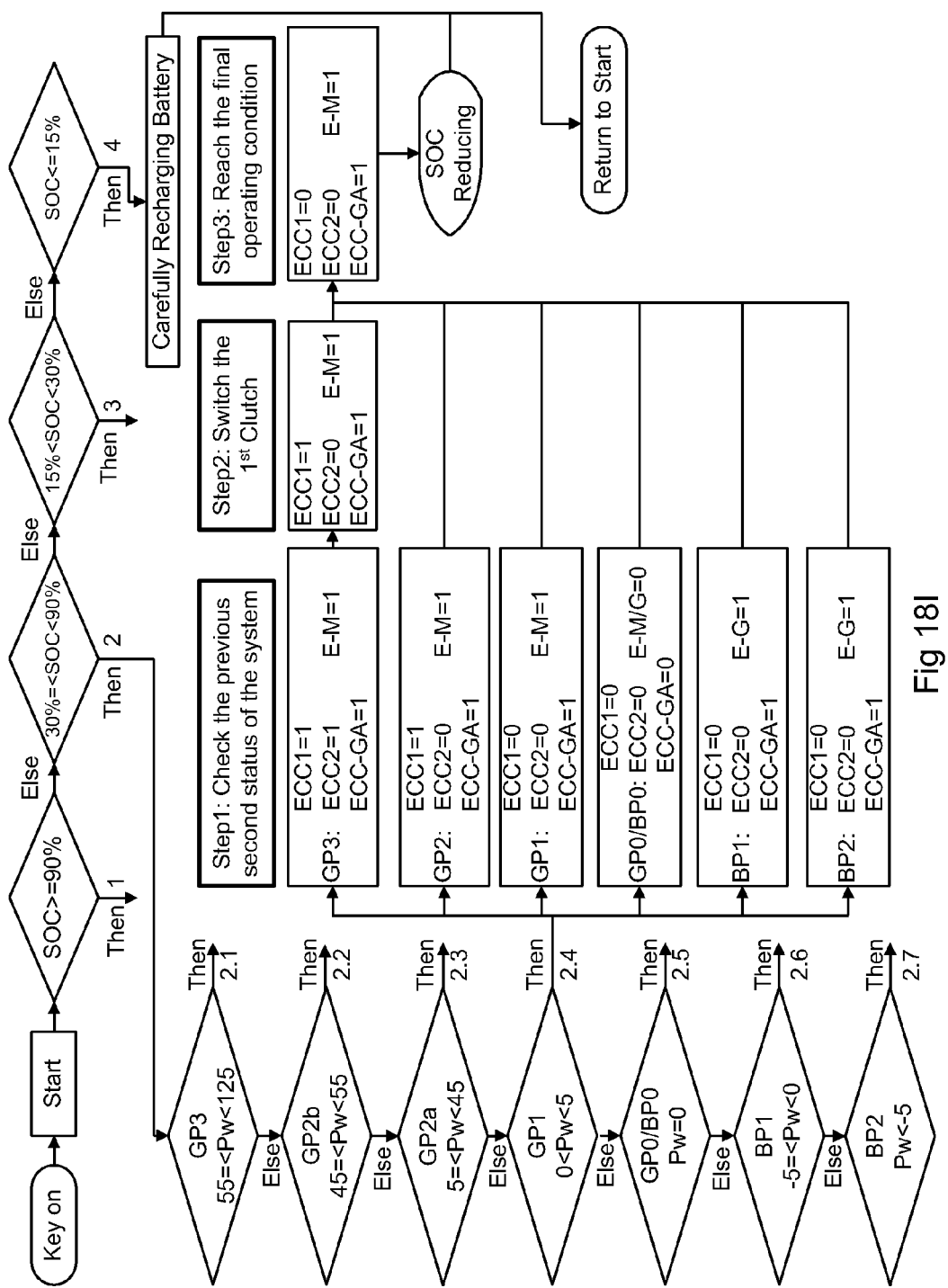
Figure 18J:
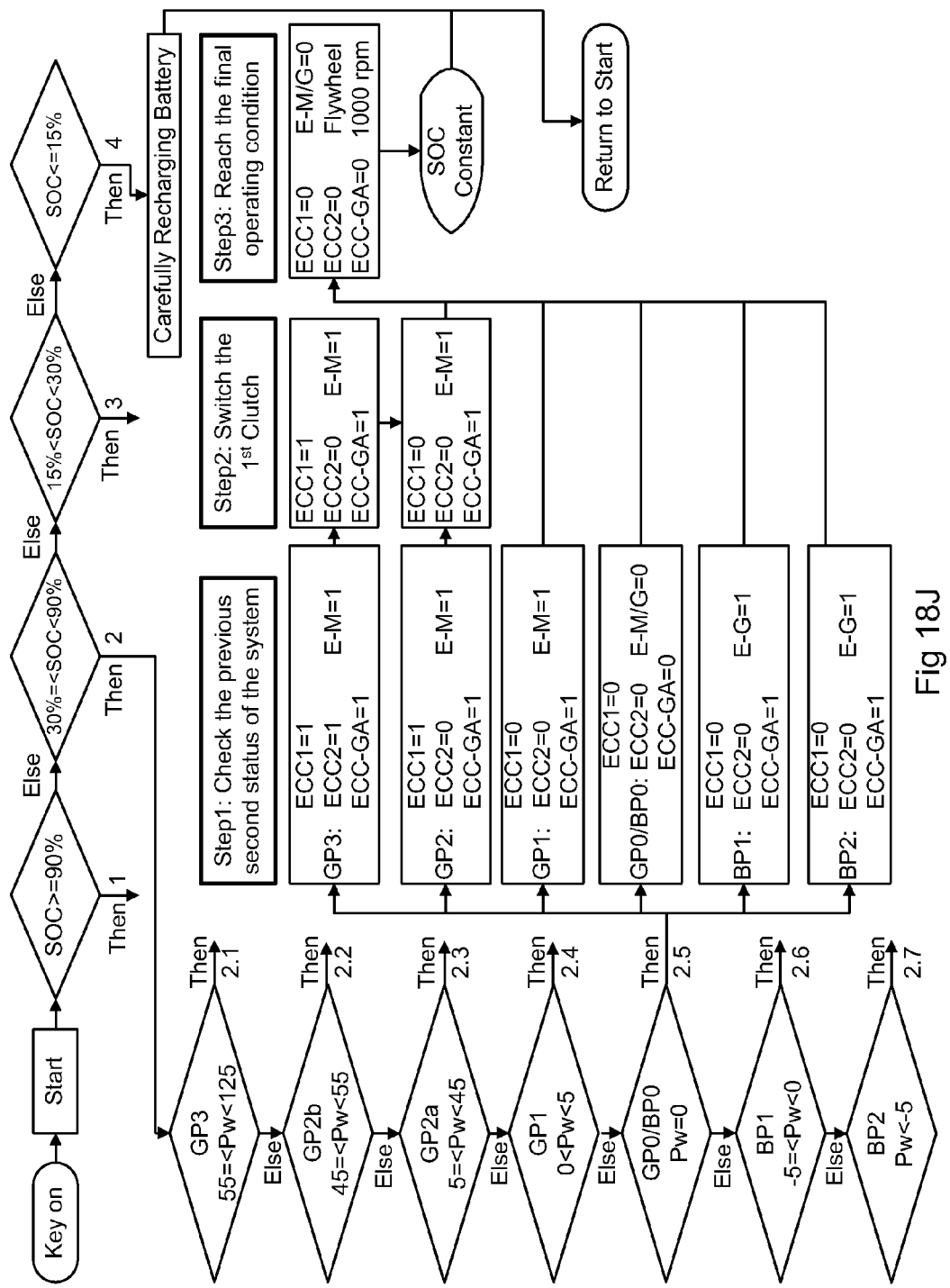
Figure 18K:
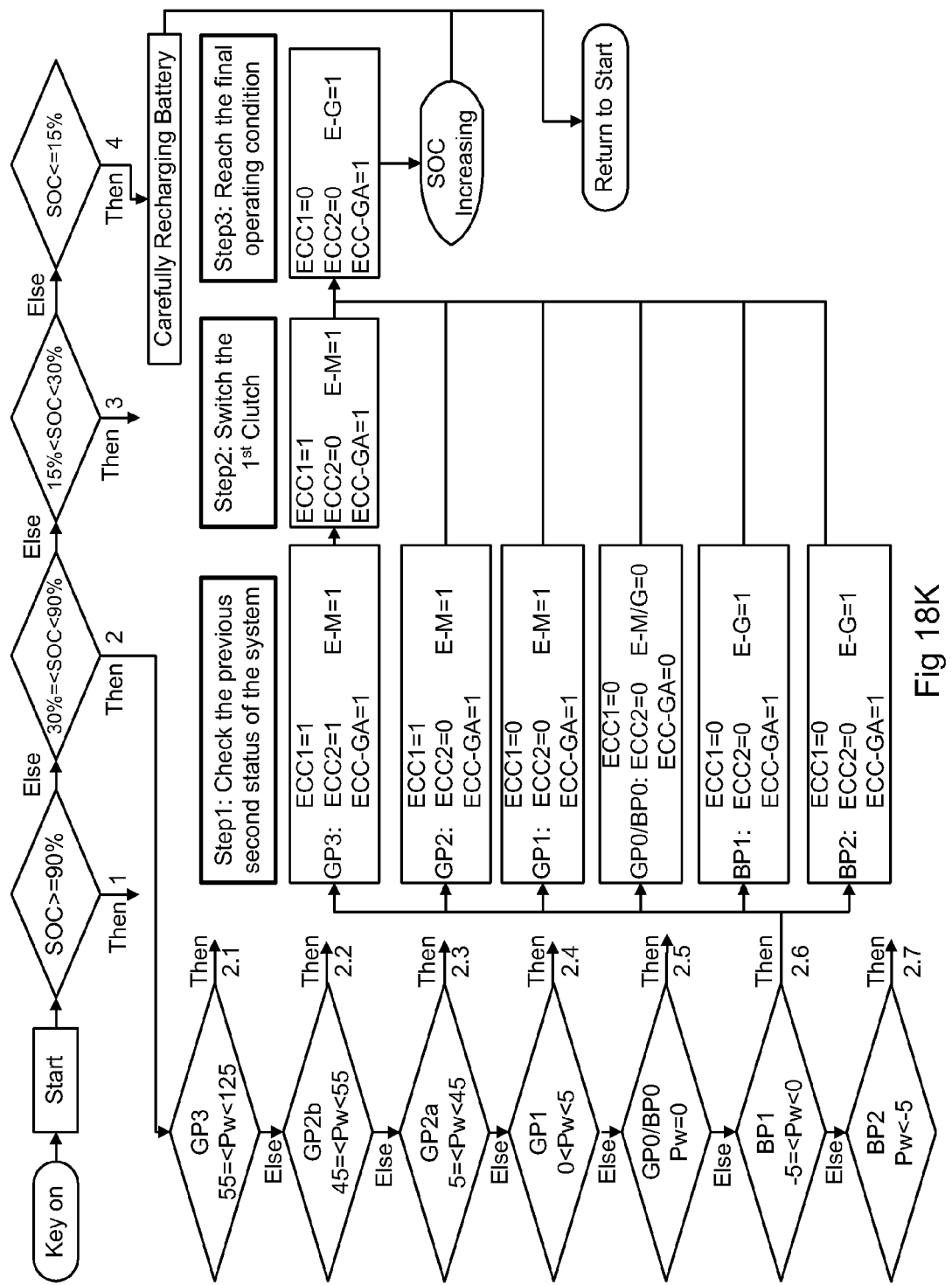
Figure 18L:
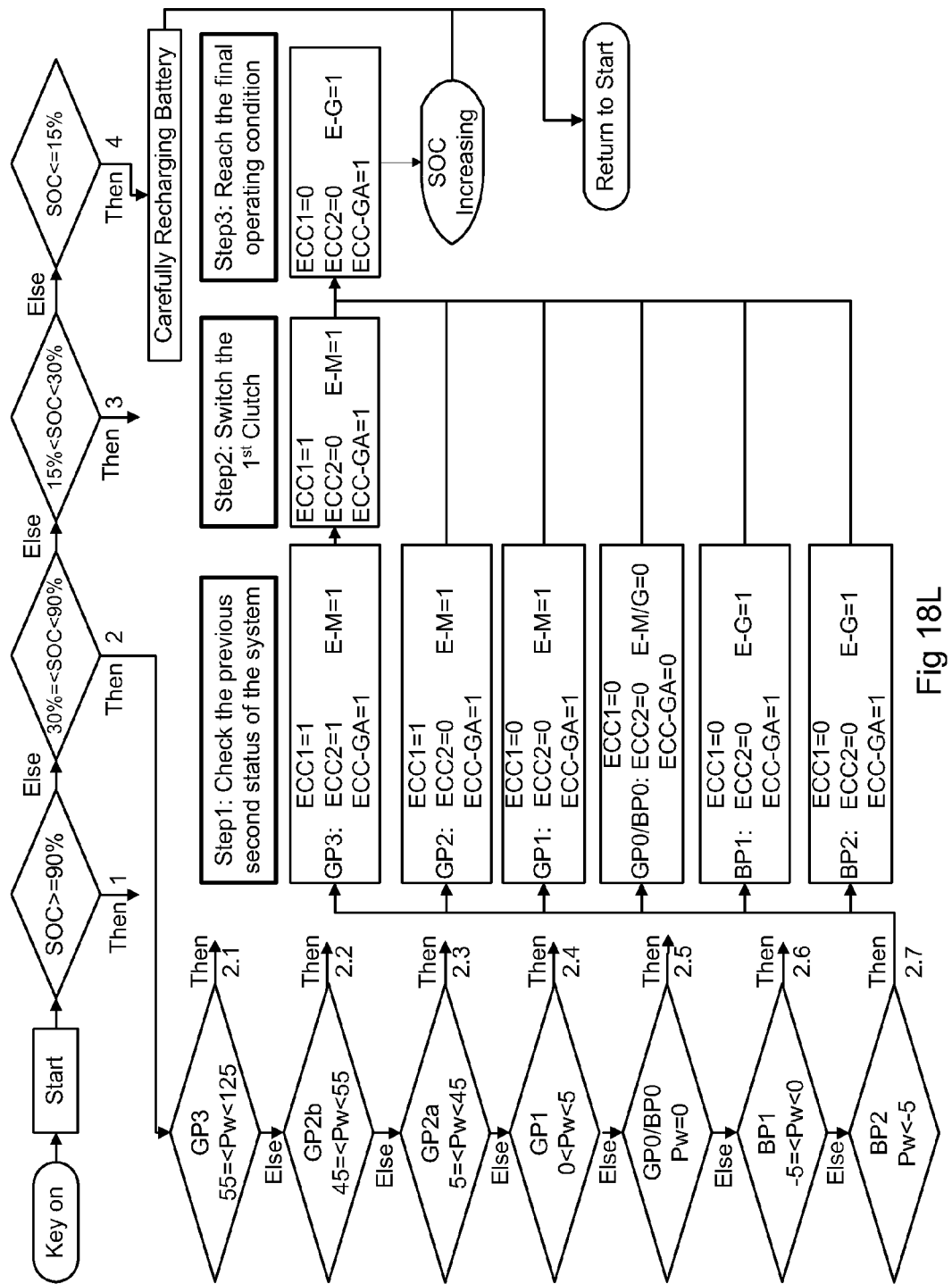
Figure 18M:
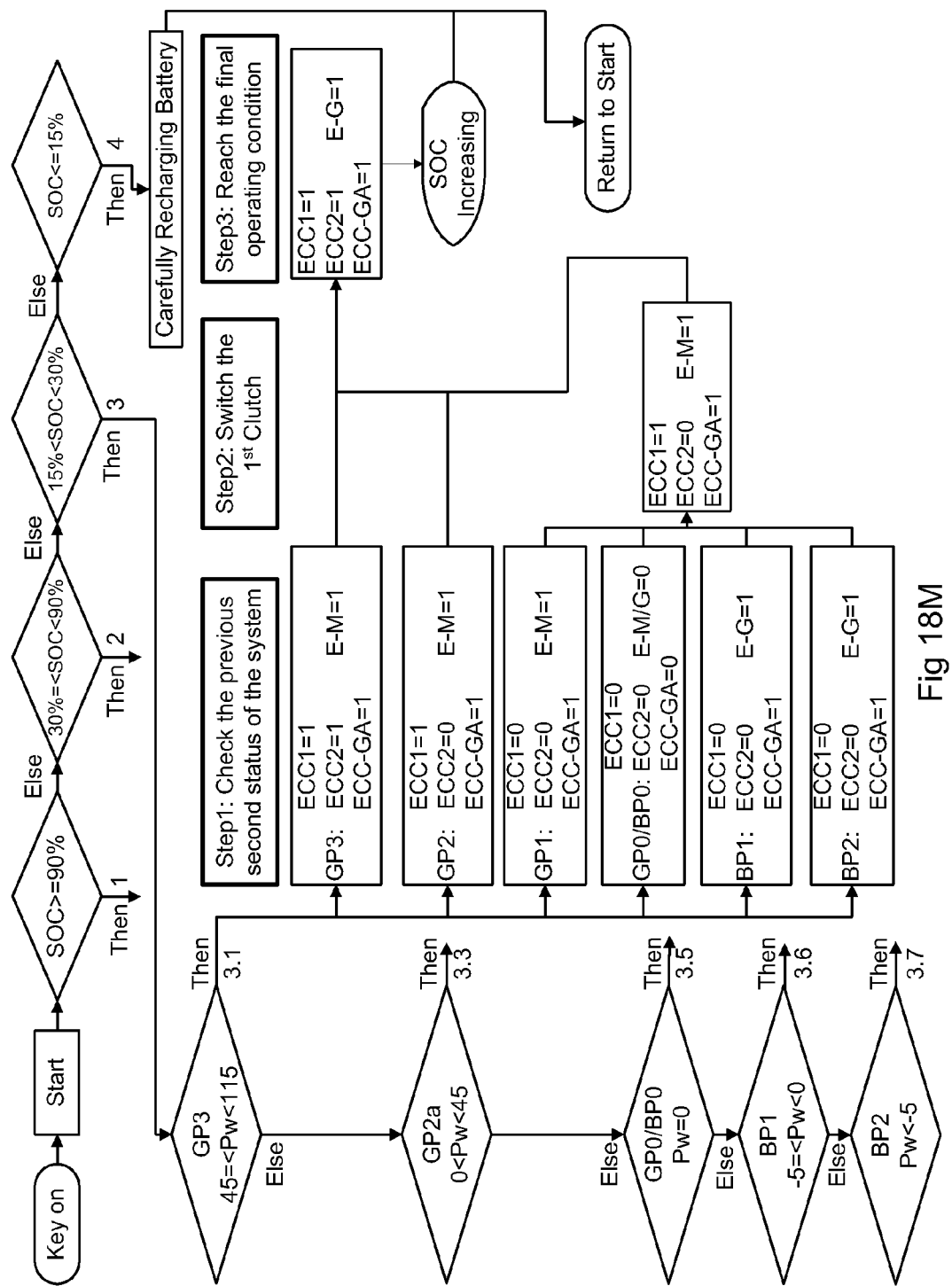
Figure 18N:
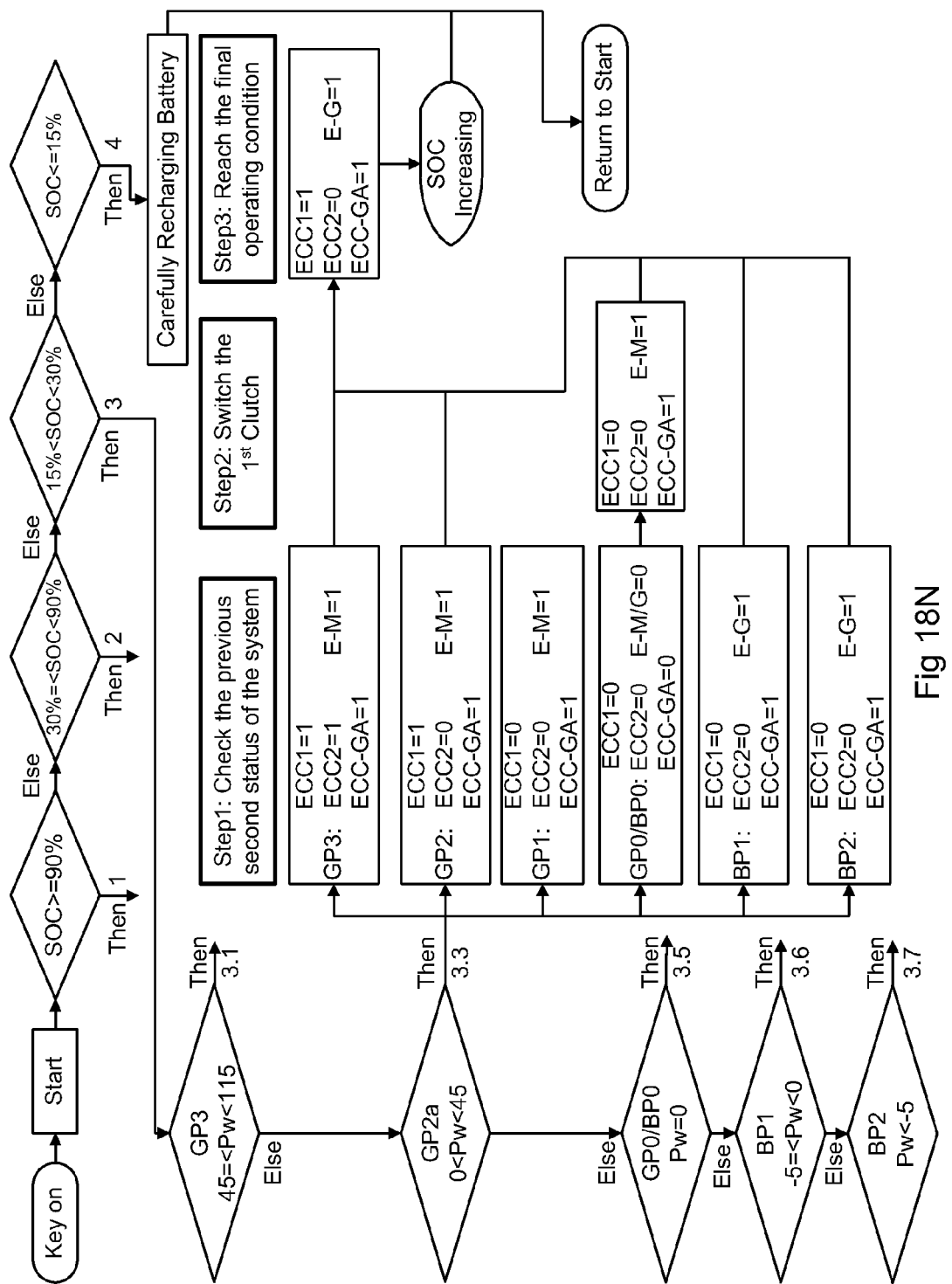
Figure 18O:
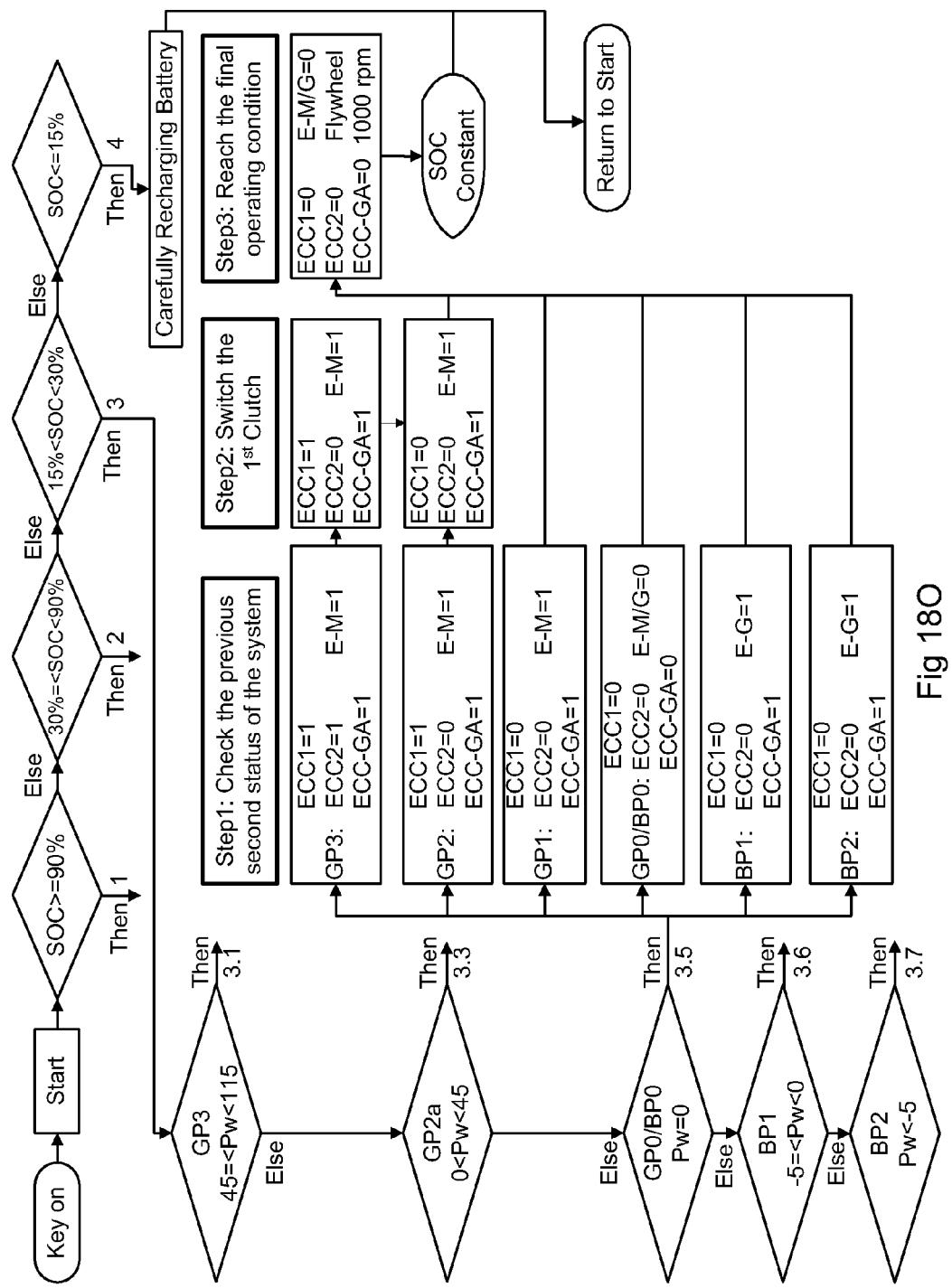
Figure 18Q:
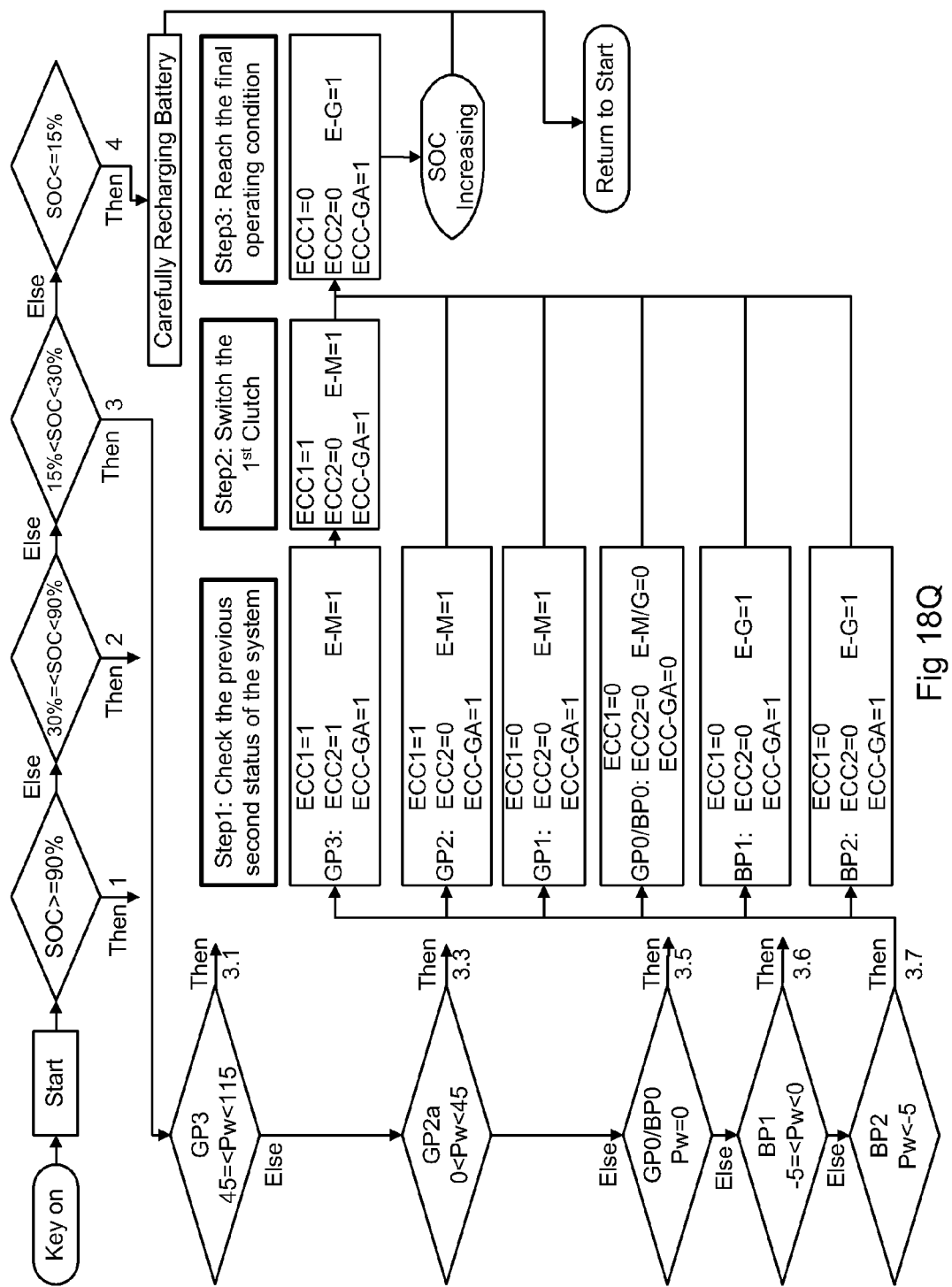

FIGS. 18A-18Q constitute a single detailed flow chart that at looks similar to the steps shown in FIG. 17, but provide enhanced control of the system based not only on the SOC, but also on the coupling settings as they existed after the last iteration of the program. The flow chart of FIGS. 18A-18Q is laid out orthogonally to FIG. 17, for purposes of making a continuous presentation on individual pages. As can be seen in FIG. 18A the first filtering takes place along the upper horizontal line where SOC is determined, as was shown in FIG. 17. To get sense of how the individual sheets of drawings are laid out, each SOC filtering determination, such as that made in FIG. 18A where the SOC is determined to be equal to or greater than 90%, is followed by the second filtering determinations in FIGS. 18B-18E. Therefore for SOC 90%, filtering is covered in FIGS. 18A-18E. For 30%≦SOC<90%, filtering is covered in 18F-18L. For 15%<SOC≦30%, filtering is covered in FIGS. 18 M-18Q.

In FIGS. 18A-18Q, for each SOC filtering determination there is a second filtering step that looks at the present position of the gas pedal and the brake pedal to determine the presently desired power setting. Differing from the flow chart in FIG. 17, after the second filtering, there is a third filtering (labeled "Steps 1-3") that looks back to see what the immediately prior coupling settings were during the last cycle iteration of the program. Based upon the "Step 1" determination, another conditional decision is made in "Step 2" as to whether or not to change the setting of any of the couplings that engage the primary engine, the secondary engine or the E/M to the system.

For instance, in FIG. 18A the first filter indicates the steps that are taken when the SOC is determined to be >=90%. In this case, the gas pedal is determined to be at its demand setting within the maximum GP3 sub-range. In Step 1, the previous setting of the gas pedal is compared to determine how the various couplings will be activated or deactivated. If the previous cycle determined that the gas pedal was at its GP3 sub-range demand setting, there would be no change to the activation of couplings. All couplings would continue to be activated to engage the flywheel and transmission to satisfy this maximum demand. However, if the prior setting of the gas pedal was in the GP2 sub-range where there was lesser demand, and the secondary engine was not on line (ECC2=0), the secondary engine would be put on line in Step 3 (ECC2=1) to provide additional power to the flywheel and the vehicle. If the prior setting of the gas pedal was in the GP1 sub-range, or GP0 and Brake pedal at BP0, then that would mean in the prior cycle only the electric motor was on-line with coupling E-M activated (E-M=1). If the prior setting was or GP0, and Brake pedal at BP0, then that would mean in the prior cycle the vehicle was coasting and the flywheel was disconnected from the transmission (ECC-CA=) and only the electric motor was on-line with coupling E-M activated (E-M=1) to keep the flywheel rotating up to speed. If the prior setting of the brake pedal was in the BP2 or BP1 sub-range then that would mean in the prior cycle only the electrical generator was on-line with coupling E-G activated (E-G=1). In this maximum sub-range demand situation when the prior determination had demand less than that for a GP2 setting, there needs to be a transition. To go from electric motor only to both primary and secondary engines at once would be an uncomfortable jolt to the system and possibly the driver. Therefore, as indicated in Step 2, the primary engine would be first engaged (ECC1=1) and then in Step 3, the secondary engine would also be engaged (ECC2=1) to provide a controlled step transition.

Following "Step 2", a final setting is made in "Step 3" for the present iteration of the program with the codes as stated in Table D. By employing this "look-back" feature, the controller can avoid the sudden activation of individual couplings between cycles and provide a smooth transition as switching is demanded by changing demands in speed or braking.

FIGS. 18B-18Q likewise show the filtering considerations for the various gas pedal and brake pedal sub-range setting determinations sensed by the controller.

As can be seen by the drawings and accompanying explanation, the present invention is a unique improvement over conventional hybrid engine systems. And while the embodiments shown here are preferred, depending on the engineering applications and requirements, they shall not be considered to be a restriction on the scope of the claims set forth below.

I claim:

1. A control system for a hybrid engine for an automotive vehicle comprising: an electrical storage power supply; a motor/generator unit; a primary fuel powered engine module; a secondary fuel powered engine module; a kinetic energy storage device; a first controllable coupler activated to connect the motor/generator unit to said kinetic energy storage device; a second controllable coupler activated to connect said primary engine module to said kinetic energy storage device; a third controllable coupler activated to connect said secondary engine module to said kinetic energy storage device; a power take-off connectable to said kinetic storage device for providing rotational torque forces to the drive-train of said vehicle; a fourth controllable coupler activated to connect said first kinetic energy storage device to said power take-off; and a controller programmed to react to various predetermined inputs from said vehicle for activating or deactivating said couplers during the operation of said vehicle; wherein a first predetermined condition is the level of electrical charge in said electrical storage power supply, wherein at a predetermined low charge said electric motor is decoupled from said kinetic energy storage device and at a predetermined high charge said electric motor is coupled to said kinetic energy storage device.

2. A control system for a hybrid engine for an automotive vehicle comprising: an electrical storage power supply; a motor/generator unit; a primary fuel powered engine module; a secondary fuel powered engine module; a kinetic energy storage device; a first controllable coupler activated to connect the motor/generator unit to said kinetic energy storage device; a second controllable coupler activated to connect said primary engine module to said kinetic energy storage device; a third controllable coupler activated to connect said secondary engine module to said kinetic energy storage device; a power take-off connectable to said kinetic storage device for providing rotational torque forces to the drive-train of said vehicle; a fourth controllable coupler activated to connect said first kinetic energy storage device to said power take-off; a speed control interface device having a range of relatively high to low speed demand settings within predefined and juxtaposed speed demand sub-ranges; a brake control interface device having a range of relatively high to low braking demand settings within predefined and juxtaposed braking demand sub-ranges; and a controller programmed to react to various predetermined inputs from said vehicle for controlling said couplers during the operation of said vehicle; wherein said controller cyclically determines the state of charge of said electrical storage power supply, determines the settings of said speed control interface device and said brake control interface device; based upon said determinations, said controller causes individual ones of said couplers to be activated or deactivated.

3. A system as in claim 2, wherein said controller is programmed to determine the setting of said speed control interface device prior to determining the setting of said brake control interface device.

4. A system as in claim 3, wherein said controller is programmed to determine the setting of said speed control interface device by looking for the settings in the highest speed demand sub-ranges prior to looking for settings in the lower speed demand sub-ranges within said range, in descending order.

5. A system as in claim 3, wherein said controller is programmed to determine the setting of said brake control interface device when said speed control interface device is at its lowest demand setting.

6. A system as in claim 5, wherein said controller is programmed to determine the setting of said brake control interface device by looking for the settings with its highest braking demand sub-ranges prior to looking for settings with its lower braking demand sub-ranges within said range, in descending order.

7. A system as in claim 2, wherein said controller is programmed to compare the prior cycle determination of settings of said speed control interface device and said brake control interface device as a conditional decision in selecting individual ones of said couplers to be activated or deactivated.

8. A system as in claim 2, wherein said kinetic energy storage device is a rotatable flywheel and controller is programmed to deactivate all said controllable couplers when said speed control interface device and said brake control interface device are both set within their lowest sub-ranges to allow said flywheel to freely rotate.

9. A system as in claim 2, wherein said controller is programmed to activate all said controllable couplers when said speed control interface device is set within its highest sub-range to provide maximum power to said kinetic energy storage device and to said power take-off.

10. A system as in claim 2, wherein said controller is programmed to determine the state of charge of said an electrical storage power supply within a plurality of predefined charge sub-ranges within its range of charge measurements and to deactivate said first controllable coupler when said state of charge is determined to be within the highest charge sub-range.

11. A control system for a hybrid engine for an automotive vehicle comprising: an electrical storage power supply; a motor/generator unit; a primary fuel powered engine module; a secondary fuel powered engine module; a kinetic energy storage integrator device; a first controllable coupler actuatable to connect the motor/generator unit to said integrator device; a second controllable coupler actuatable to connect said primary engine module to said kinetic energy storage device; a third controllable coupler actuatable to connect said secondary engine module to said integrator device; a power take-off connectable to said integrator device for providing rotational torque forces to the drive-train of said vehicle; a fourth controllable coupler actuatable to connect said first kinetic energy storage device to said power take-off; a speed control interface device having a range of relatively high to low speed demand settings within a plurality of predefined and juxtaposed sub-ranges; a brake control interface device having a range of relatively high to low braking demand settings within a plurality of predefined and juxtaposed sub-ranges; and a controller programmed to react to various predetermined inputs from said vehicle for controlling the activation and deactivation of said couplers during the operation of said vehicle; wherein said controller cyclically determines the state of charge of said electrical storage power supply, determines the settings of said speed control interface device and said brake control interface device; and based upon said determinations, said controller causes individual ones of said couplers to be activated or deactivated.

12. A system as in claim 11, wherein said controller is programmed to act on the determined setting of said speed control interface device above its lowest sub-range in lieu of determining the setting of said brake control interface device.

13. A system as in claim 12, wherein said controller is programmed to determine the setting of said speed control interface device by looking for the highest settings prior to looking for lower settings within said range, in descending order.

14. A system as in claim 12, wherein said controller is programmed to determine the setting of said brake control interface device when said speed control interface device is at its lowest demand setting.

15. A system as in claim 14, wherein said controller is programmed to determine the setting of said brake control interface device by looking for the highest settings prior to looking for lower settings within said range, in descending order.

16. A system as in claim 11, wherein said controller is programmed to compare the prior cycle determination of settings of said speed control interface device and said brake control interface device as a conditional decision in selecting individual ones of said couplers to be activated or deactivated.

17. A system as in claim 11, wherein said kinetic energy storage device is a rotatable flywheel and controller is programmed to deactivate all said controllable couplers when said speed control interface device and said brake control interface device are both set within their lowest sub-ranges to allow said flywheel to freely rotate.

18. A system as in claim 11, wherein said controller is programmed to activate all said controllable couplers when said speed control interface device is set within its highest sub-range to provide maximum power to said kinetic energy storage device and to said power take-off.

19. A system as in claim 11, wherein said controller is programmed to determine the state of charge of said an electrical storage power supply within a plurality of predefined sub-ranges within its range of charge measurements and to deactivate said first controllable coupler when said state of charge is determined to be within the highest sub-range of charges.

20. A system as in claim 11, wherein said second, third and fourth controllable couplers are actuatable clutches.

* * * * *